United States Patent
Uchida

(10) Patent No.: US 10,447,869 B2
(45) Date of Patent: Oct. 15, 2019

(54) OPTIMIZATION OF SWEEPING CORRECTION IN PRINTING ON CONTINUOUS PAGES

(71) Applicant: KONICA MINOLTA, INC., Chiyoda-ku, Tokyo (JP)

(72) Inventor: Yuji Uchida, Tachikawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/059,198

(22) Filed: Aug. 9, 2018

(65) Prior Publication Data

US 2019/0068802 A1 Feb. 28, 2019

(30) Foreign Application Priority Data

Aug. 30, 2017 (JP) ................. 2017-166049

(51) Int. Cl.
*H04N 1/00* (2006.01)
*G03G 15/00* (2006.01)

(52) U.S. Cl.
CPC ..... *H04N 1/00167* (2013.01); *G03G 15/5016* (2013.01); *G03G 15/5087* (2013.01); *G03G 15/602* (2013.01); *G03G 15/6517* (2013.01); *H04N 1/00005* (2013.01); *H04N 1/0057* (2013.01)

(58) Field of Classification Search
None
See application file for complete search history.

(56) References Cited

U.S. PATENT DOCUMENTS

2013/0057924 A1* 3/2013 Genda ............... G06K 9/44
   358/3.27
2017/0076185 A1* 3/2017 Mizuno ............... H04N 1/60

FOREIGN PATENT DOCUMENTS

JP    2007272153 A    10/2007
JP    2017053985 A    3/2017

* cited by examiner

*Primary Examiner* — Lennin R RodriguezGonzalez
(74) *Attorney, Agent, or Firm* — Buchanan Ingersoll & Rooney PC

(57) ABSTRACT

An image processing apparatus that outputs a plurality of page images on a transfer medium continuous in a conveying direction, the image processing apparatus includes a hardware processor that performs data processing on the images on a page basis, wherein the hardware processor, upon the data processing, obtains a density change of each of the images with reference to a pixel of each of the images within a predetermined width in the conveying direction of the transfer medium, and, based on the density change, performs density correction of each of the images on a pixel basis within a page, and in a case where a pixel outside the page is included within the predetermined width in the conveying direction, data processing different from the density correction is performed.

20 Claims, 17 Drawing Sheets

FIG. 3

| TARGET AREA | SWEEPING CORRECTION |
|---|---|
| FRONT END OF FIRST PAGE | ENABLED |
| REAR END OF LAST PAGE | ENABLED |
| REAR END OF FIRST PAGE, FRONT END OF LAST PAGE FRONT END AND REAR END OF OTHER PAGES | DISABLED |
| INSIDE OF PAGE | ENABLED |

FIRST PAGE OF
DOCUMENT IMAGE

SECOND PAGE OF
DOCUMENT IMAGE

DENSITY CHANGE REFERENCE RANGE

OUTPUT AND CORRECTION
METHOD FOR EACH AREA

PAGE REAR END PORTION
CASE WHERE REFERENCE TO
OUTSIDE OF PAGE DOES NOT OCCUR

PAGE REAR END PORTION
CASE WHERE REFERENCE TO
NEXT PAGE OCCURS

PAGE FRONT END PORTION
CASE WHERE REFERENCE TO
PREVIOUS PAGE OCCURS

PAGE FRONT END PORTION
CASE WHERE REFERENCE TO
PREVIOUS PAGE DOES NOT OCCUR

FIRST PAGE OF
DOCUMENT IMAGE

SECOND PAGE OF
DOCUMENT IMAGE

PSEUDO ORIGINAL IMAGE DURING
REFERENCE TO DENSITY CHANGE

ACTUAL OUTPUT

FIRST PAGE OF DOCUMENT

SECOND PAGE OF DOCUMENT

FIRST PAGE OF DOCUMENT IMAGE
AFTER RIP PROCESSING

SECOND PAGE OF DOCUMENT IMAGE
AFTER RIP PROCESSING

DOCUMENT IMAGE

SHEET FEEDING DIRECTION

OUTPUT WITHOUT CORRECTION

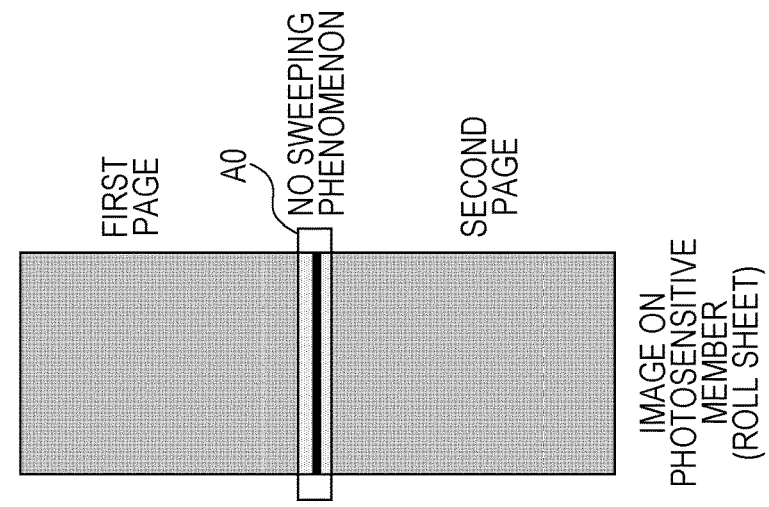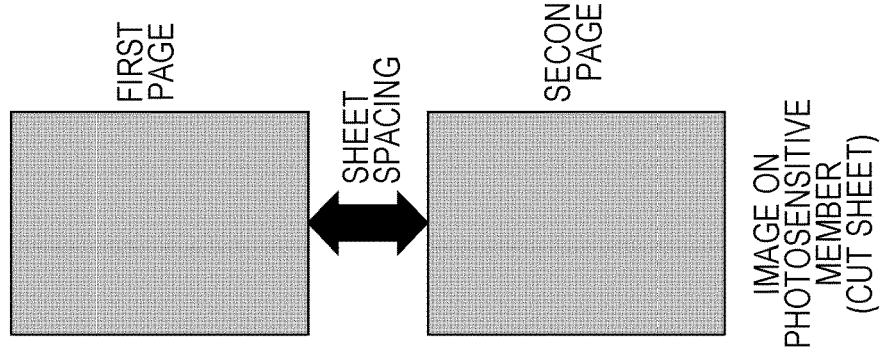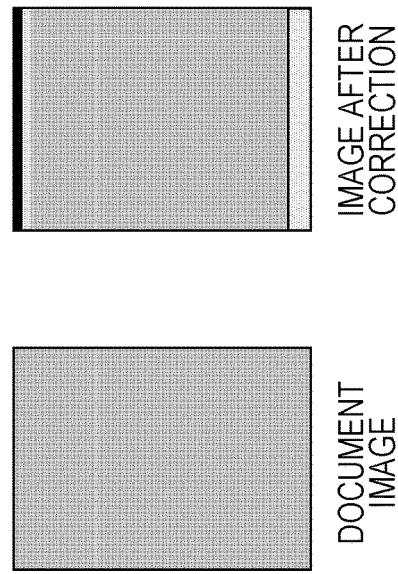

OPTIMIZATION OF SWEEPING CORRECTION IN PRINTING ON CONTINUOUS PAGES

The entire disclosure of Japanese patent Application No. 2017-166049, filed on Aug. 30, 2017, is incorporated herein by reference in its entirety.

BACKGROUND

Technological Field

The present invention relates to an image processing apparatus, an image forming apparatus, and a program that process image data for image formation by an electrophotographic system.

Description of the Related Art

In an image forming apparatus that forms an image by an electrophotographic system, it is known that a phenomenon occurs called sweeping up (hereinafter referred to as "sweeping").

The sweeping phenomenon occurs at a portion where a density change occurs in a sheet feeding direction during development, and density becomes thinner than image data at a portion where the density changes densely, and on the contrary, density becomes denser than image data at a portion where the density changes thinly.

FIGS. 16A and 16B are diagrams showing an example of the sweeping phenomenon. In a case where a document image G1 shown in FIG. 16A is printed on a sheet, as shown in FIG. 16B, in an image G2, in an area of the image front end side in the sheet feeding direction, that is, in an area where image density changes densely, the image density becomes thinner, and in an area of the rear end side of the image in the sheet feeding direction, that is, in an area where image density changes thinly, the image density becomes denser.

Conventionally, as sweeping correction, image data is corrected such that the image density is made denser of a portion where the image density becomes thinner, and the image data is corrected such that the image density is made thinner of a portion where the image density becomes denser.

For example, JP 2017-53985 A devises an apparatus that performs correction in a high density area by identifying a solid area of image data and then scanning a pixel of interest with respect to the solid area in a predetermined direction.

In addition, JP 2007-272153 A describes that image density correction is performed on the basis of image data located on the downstream side of the pixels.

In a case where the sweeping correction is performed on image data, the sweeping correction for a certain pixel is determined with reference to a plurality of pixels within predetermined widths in front and in back of the pixel in the sheet feeding direction. In the pixels located at the front and rear ends of a page, since there is a sheet spacing of about several tens of millimeters between pages of cut sheets, no pixels to be referenced exist in front and back, respectively. In pixel correction, in a case where there is a sheet spacing within a predetermined width, since the outside of the image data is not exposed, the correction is performed assuming that a white pixel exists.

JP 2017-53985 A and JP 2007-272153 A each assume an apparatus that prints on a cut sheet basis such as A4, A3, and the like, and the correction is performed assuming that a white image exists on the outside of the image data, whereby the sweeping correction can be appropriately performed also at the front and rear ends of the image.

However, in the case of an image forming apparatus targeting a roll sheet or a long sheet, a plurality of pages are continuously output on a sheet in a conveying direction, and it is desired to make a boundary between pages (image interval) as small as possible, so that the image interval is about 0 mm to 1 mm. Particularly, in a case where the image interval is 0 mm, the assumption does not hold that there is a white pixel outside the image data, which is assumed for the cut sheet. For that reason, in a case where the correction is performed by regarding the outside of the image data as a white image, similarly to the cut sheet, there is a problem that an output becomes such that a streak is included at the boundary of the page.

FIGS. 17A to 17D show states in a case where the sweeping correction is performed on a cut sheet and a continuous sheet.

When the sweeping correction is performed by regarding the outside of the page as a white image with respect to the document image shown in FIG. 17A, as shown in FIG. 17B, the correction is performed so that a front end portion of the image is printed densely and a rear end portion is printed thinly.

FIG. 17C shows a state in a case where an image is printed on a cut sheet after the sweeping correction. In a case where the cut sheet is used, since there is a sufficient interval between the sheets, by regarding the outside of the page as a white image, it is possible to obtain an output in which the sweeping phenomenon is corrected appropriately.

However, in a case where image formation is performed without an image interval in a long sheet or a continuous sheet such as a roll sheet, as shown in FIG. 17D, in a boundary area A0 of the page, the sweeping correction is performed in spite of the fact that the sweeping phenomenon does not occur actually, and the rear end of the page image is printed thinly, and the front end of the page image is printed densely. As a result, it becomes an output including a streak.

SUMMARY

The present invention has been made in view of the above-described problems, and it is an object of the present invention to provide an image processing apparatus, image forming apparatus and program capable of appropriately performing the sweeping correction in a case where a plurality of pages is printed on a transfer medium continuously in the conveying direction.

To achieve the abovementioned object, according to an aspect of the present invention, there is provided an image processing apparatus that outputs a plurality of page images on a transfer medium continuous in a conveying direction, and the image processing apparatus reflecting one aspect of the present invention comprises a hardware processor that performs data processing on the images on a page basis, wherein the hardware processor, upon the data processing, obtains a density change of each of the images with reference to a pixel of each of the images within a predetermined width in the conveying direction of the transfer medium, and, based on the density change, performs density correction of each of the images on a pixel basis within a page, and in a case where a pixel outside the page is included within the predetermined width in the conveying direction, data processing different from the density correction is performed.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 3 is a diagram showing a target area of sweeping correction in Method 1;

FIGS. 17A to 17D are diagrams showing sweeping correction in a conventional image forming apparatus.

DETAILED DESCRIPTION OF EMBODIMENTS

Hereinafter, an image forming apparatus as one or more embodiments of the present invention will be described with reference to the drawings. However, the scope of the invention is not limited to the disclosed embodiments.

Figure 1:
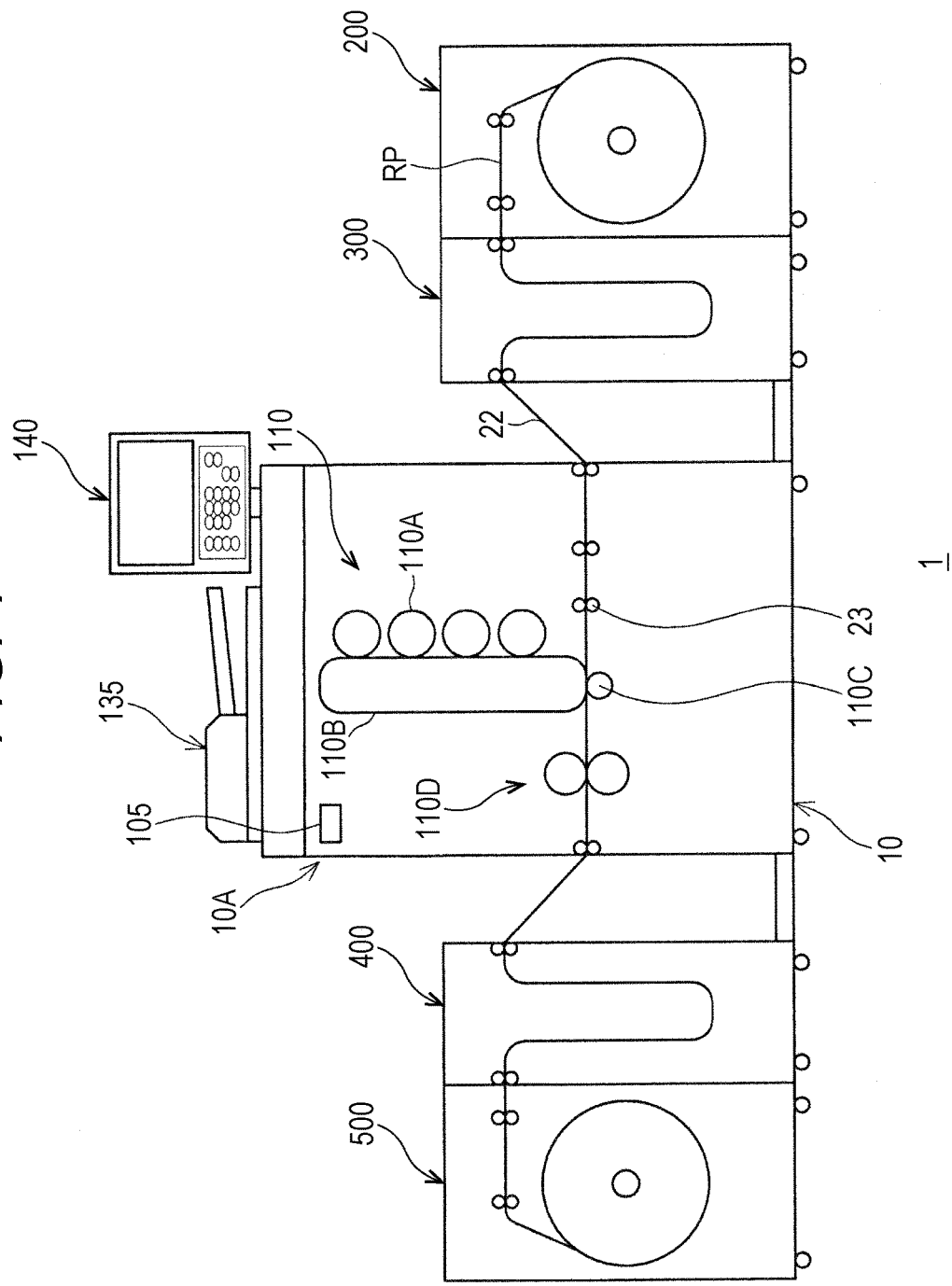
FIG. 1 is a diagram showing a mechanical configuration of an image forming apparatus according to an embodiment of the present invention.

As shown in FIG. 1, the image forming apparatus 1 includes a sheet feeding unit 200, a sheet feeding adjustment unit 300, an apparatus main body unit 10, a sheet ejection adjustment unit 400, and a sheet ejection unit 500 in this order from the upper stage side. The units are electrically and mechanically connected together, and communication between the units and movement of a sheet are possible. The sheet is conveyed from the sheet feeding unit 200 toward the sheet ejection unit 500.

Note that, the type and the number of apparatuses constituting the image forming apparatus 1 are not particularly limited, and another apparatus such as a post-processing apparatus may be included. In addition, an apparatus main body unit alone may constitute an image forming apparatus, and the image forming apparatus composed of the apparatus main body unit, and other units may constitute an image forming system.

The image forming apparatus 1 includes a conveying path 22 extending from the sheet feeding unit 200 to the sheet ejection unit 500, and a conveying roller 23 is provided in the conveying path 22.

A roll sheet RP is stored in the sheet feeding unit 200, and the roll sheet RP in the sheet feeding unit 200 is conveyed to each unit of the subsequent stage through the conveying path 22. The roll sheet RP corresponds to a transfer medium of the present invention. Note that, the transfer medium of the present invention is not limited to the roll sheet, and the transfer medium may be one in which long sheet is folded and stored, such as a continuous form sheet. In addition, as the transfer medium of the present invention, it is not necessary to be a continuous transfer medium, and a transfer medium can be used capable of printing a plurality of pages, such as a long sheet. In addition, the transfer medium is not limited to paper, and may be cloth, plastic, or the like.

The sheet feeding adjustment unit 300 absorbs a difference in conveying speed between the sheet feeding unit 200 and the apparatus main body unit 10, and a deviation of the sheet.

The apparatus main body unit 10 is an apparatus that forms an image on a sheet, and an image former 110 that forms an image on a sheet by an electrophotographic system is provided in the middle of the conveying path 22.

The image former 110 includes a photosensitive member 110A for each color, and around the photosensitive member 110A, a charger, an LD, a developing unit, a cleaning unit, and the like (not shown) are provided. The photosensitive member 110A for each color is in contact with an intermediate transfer belt 110B, and the intermediate transfer belt 110B can be brought into contact with the roll sheet RP on the conveying path 22 in a secondary transfer unit 110C. Further, in the conveying path 22, a fixing unit 110D is provided on the downstream side of the secondary transfer unit 110C.

In a case where an image is formed on a sheet, the photosensitive member 110A is uniformly charged by the charger, and then a latent image is drawn on the photosensitive member 110A by the LD on the basis of image data. Then, the developing unit causes toner to adhere and develops the latent image on the photosensitive member 110A to obtain a toner image. The toner image on the photosensitive member 110A is transferred onto the intermediate transfer belt 110B so that toner images for respective colors are superimposed on each other, and the toner images on the intermediate transfer belt are transferred to the sheet by the secondary transfer unit 110C. The toner images transferred onto the sheet are fixed on the sheet by application of heat and pressure by the fixing unit 110D.

An automatic document feeder (ADF) 135 is provided on the top of the casing of the apparatus main body unit 10.

The automatic document feeder (ADF) 135 automatically feeds a set document and reads an image of the document by a CCD of a scanner unit. Image data acquired by reading is used for image formation and the like.

In addition, an operation display unit 140 is provided on the top of the casing of the apparatus main body unit 10. The operation display unit 140 includes a touch panel type LCD, a group of operation keys, and the like, so that information display and operation input are possible. In the operation display unit 140, it may be enabled to set correction for sweeping, or how to perform processing at a page end in correction operation.

The apparatus main body unit 10 further includes a control unit 105. The control unit 105 includes a CPU, a storage unit such as ROM and RAM, a program operating in the CPU, and the like, and controls the entire image forming apparatus 1. The program operating on the CPU includes a program of the present invention.

In addition, in this embodiment, it is described that the image forming apparatus corresponds to the image processing apparatus; however, the image processing apparatus of the present invention only needs to be able to process image data, and may be the one not including the image former.

Figure 2:
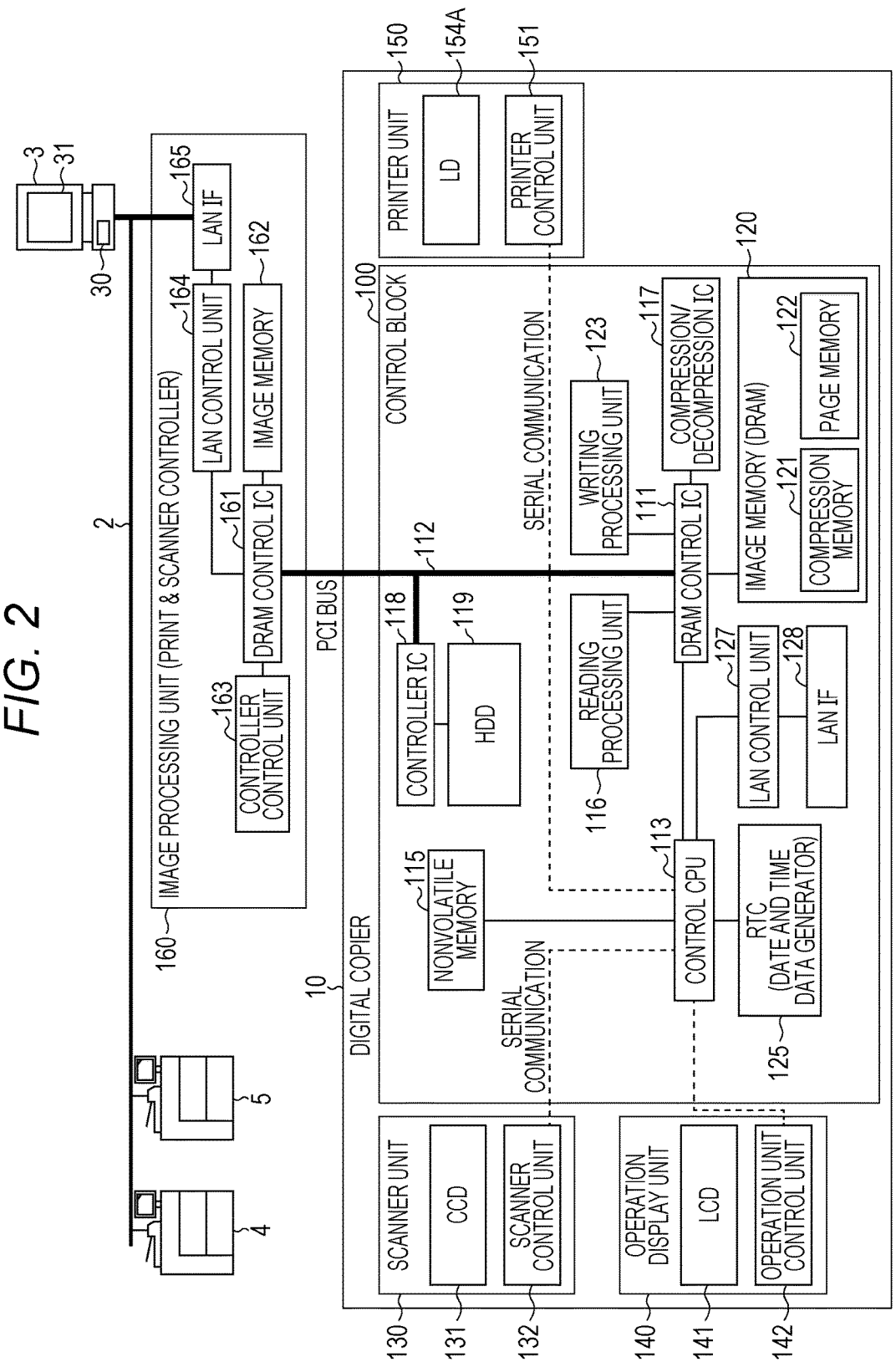
FIG. 2 is a diagram showing functional blocks.

Next, a functional configuration of the image forming apparatus 1 will be described with reference to FIG. 2.

The image forming apparatus 1 includes a digital copier and an image processing unit (print & scanner controller) 160, as a main configuration. The digital copier includes a control block 100, a scanner unit 130, the operation display unit 140, and a printer unit 150, and the image processing unit (print & scanner controller) 160 processes image data input/output to/from an external apparatus.

The control block 100 includes a PCI bus 112, and to the PCI bus 112, a DRAM control IC 111 and a controller IC 118 in the control block 100 are connected. In addition, a DRAM control IC 161 of the image processing unit (print & scanner controller) 160 is connected to the PCI bus 112.

An HDD 119 is connected to the controller IC 118, and desired data such as image data and setting data can be stored in the HDD 119.

In the control block 100, a control CPU 113 is connected to the DRAM control IC 111.

A nonvolatile memory 115 is connected to the control CPU 113. The nonvolatile memory 115 stores a program executed by the control CPU 113, setting data such as machine setting information, process control parameters, parameters necessary for operation of sweeping correction, and the like. The parameters necessary for the sweeping correction include the width of an area to be referenced at the sweeping correction, the number of pixels to be referenced, and the like. Note that, in a case where pixels are referenced within ranges of different lengths in the front end direction and the rear end direction during the sweeping correction, the reference width in the front end direction and the reference width in the rear end direction are stored as information.

The control CPU 113 can control the entire image forming apparatus 1 by execution of the program, and can control operations such as conveying of the sheet and image formation, processing of image data for image formation, and the like. The control CPU 113 and the program operating in the control CPU 113 constitute a control unit of the present invention. Note that, the program is not necessarily stored in the nonvolatile memory, and may be stored in a portable storage medium.

An RTC (date and time data generator) 125 is connected to the control CPU 113, and date and time data can be transmitted to the control CPU 113.

A LAN control unit 127 is connected to the control CPU 113, and a LAN interface 128 is connected to the LAN control unit 127. A network or an external apparatus can be connected to the LAN interface 128, and transmission and reception of data can be performed to/from the outside via the LAN interface 128 and the LAN control unit 127.

A scanner control unit 132 of the scanner unit 130 is further connected to the control CPU 113 so as to enable serial communication.

The scanner unit 130 includes a CCD 131 that optically reads an image on a sheet, and the scanner control unit 132 that controls the entire scanner unit 130. The scanner control unit 132 can control each unit of the scanner unit 130 in response to an instruction from the control CPU 113. The scanner control unit 132 includes a CPU, a storage unit, a program, and the like.

The image data read by the CCD 131 is transmitted to a reading processing unit 116, and predetermined processing is performed such as shading correction.

An operation unit control unit 142 of the operation display unit 140 is further connected to the control CPU 113 so as to enable serial communication.

The operation display unit 140 includes a touch panel type LCD 141 and the operation unit control unit 142.

Operation input and information display are possible on the LCD 141, and the operation unit control unit 142 can control the entire operation display unit 140 on the basis of an instruction from the control CPU 113 and can transmit information to the control CPU 113. The operation unit control unit 142 can include a CPU, a storage unit, a program for operating the CPU, and the like.

In the operation display unit 140, it is possible to input operation control conditions such as settings and operation commands in the image forming apparatus 1, and further, it is possible to display setting details, a machine state, the information, and the like.

A printer control unit 151 of the printer unit 150 is further connected to the control CPU 113 so as to enable serial communication.

The printer unit 150 includes an LD 154A and the printer control unit 151. The printer control unit 151 controls the entire printer unit 150 on the basis of an instruction from the control CPU 113, and controls conveying of the sheet and image forming operation. The printer unit 150 includes the image former 110, the conveying path 22, the conveying roller 23, and the like.

The LD 154A collectively refers to the LDs for respective colors, and forms a latent image on the photosensitive member on the basis of the image data processed by a writing processing unit 123. The latent image on the photosensitive member is then developed and used for image formation.

In addition, the DRAM control IC 111 is connected to an image memory 120. Image data acquired by the scanner unit 130 and image data acquired through a network 2 are stored in the image memory 120.

The image memory 120 includes a compression memory 121 and a page memory 122, the compression memory 121 stores compressed image data, the page memory 122 stores image data expanded for image formation on a page basis, and it is also possible to store image data of a plurality of pages.

In the image memory 120, image data of a job to be output can be stored, and image data of a plurality of jobs can also be stored by the DRAM control IC 111.

Note that, the image data can also be stored in the HDD 119.

A compression/decompression IC 117 is further connected to the DRAM control IC 111. The compression/decompression IC 117 can compress and decompress image data.

The reading processing unit 116 and the writing processing unit 123 are connected to the DRAM control IC 111.

The reading processing unit 116 performs predetermined processing on the image data acquired by the CCD 131 of the scanner unit 130.

The writing processing unit 123 is connected to the LD 154A of the printer unit 150 and processes image data to be used for image formation. For example, density correction and sweeping correction can be performed. Note that, the density correction and the sweeping correction may be performed by the control CPU 113 or a controller control unit 163 of the image processing unit (print & scanner controller) 160.

In the image processing unit (print & scanner controller) 160, the DRAM control IC 161 is connected to the PCI bus 112.

An image memory 162, the controller control unit 163, and a LAN control unit 164 are connected to the DRAM control IC 161, and a LAN interface 165 is connected to the LAN control unit 164. The LAN interface 165 is connected to the network 2. The controller control unit 163 includes a CPU, a storage unit, a program, and the like, and can control the image processing unit (print & scanner controller) 160.

The controller control unit 163 of the image processing unit (print & scanner controller) 160 can perform raster image processor (RIP) processing on an image externally acquired. Note that, the RIP processing may be performed by the control CPU 113.

An external apparatus 3, other image forming apparatuses 4 and 5, and the like are connected to the network 2, and transmission and reception of image data can be performed to/from the image forming apparatus 1. Note that, the network 2 may be used as a WAN besides a LAN, and may be wireless or wired.

The external apparatus 3 can be used as an apparatus that functions as a terminal, an apparatus that manages an image forming apparatus, or the like.

The external apparatus 3 includes an external control unit 30 that controls the entire external apparatus 3, and an external display unit 31 that displays information. The external control unit 30 can include a CPU, a program for operating the CPU, a storage unit, and the like.

In addition, the external control unit 30 can communicate with the image forming apparatuses 1, 4, and 5 to perform image processing in these apparatuses. In this case, the external apparatus 3 functions as an image processing apparatus, and the external control unit 30 corresponds to the control unit of the present invention. In addition, the external control unit 30 of the external apparatus 3 may manage the image forming apparatus. In this case, the external apparatus 3 is a management apparatus of the present invention. The external apparatus 3 may control the image forming apparatus, or may perform instruction of control details to the image forming apparatus so that control is performed by the control unit of the image forming apparatus in accordance with the instruction details.

Next, basic operation of the image forming apparatus 1 will be described.

First, a procedure will be described for accumulating image data in the image forming apparatus 1.

In a case where image data is acquired by the scanner unit 130, first, an image of a document is optically read by the CCD 131 of the scanner unit 130. In this case, the control CPU 113 commands the scanner control unit 132, and the scanner control unit 132 performs operation control of the CCD 131.

The image read by the CCD 131 is subjected to data processing by the reading processing unit 116, and thereafter the image data is compressed with a predetermined method in the compression/decompression IC 117, and the compressed image data is stored in the compression memory 121 or the HDD 119 via the DRAM control IC 111. The image data stored in the compression memory 121 or the HDD 119 can be managed as a job by the control CPU 113.

In a case where the image data is externally acquired, for example, in a case where the image data is acquired from the external apparatus 3, another image forming apparatus 4 or 5, or the like through the network 2, the image data is received by the LAN interface 165 and stored in the image memory 162 via the LAN control unit 164 and the DRAM control IC 161. These operations are performed by the control of the controller control unit 163. In a case where the RIP processing is performed on image data, the image data is once transferred to the controller control unit 163 to be subjected to the RIP processing, and an obtained bitmap image is stored in the image memory 162. Note that, the RIP processing may be performed by the control CPU 113.

Thereafter, the data of the image memory 162 is transmitted to the page memory 122 via the DRAM control IC 161, the PCI bus 112, and the DRAM control IC 111, and is temporarily stored in the page memory 122. The data stored in the page memory 122 is sequentially transmitted to the compression/decompression IC 117 via the DRAM control IC 111 and compressed, and the compressed image data is stored in the compression memory 121 or the HDD 119. The image data is managed by the control CPU 113.

In a case where image output is performed by the image forming apparatus 1, that is, in a case where the image forming apparatus 1 is used as a copying machine or a printer, the image data stored in the compression memory 121 or the HDD 119 is transmitted to the compression/decompression IC 117 via the DRAM control IC 111, and the image data is expanded in the compression/decompression IC 117.

Thereafter, the expanded image data is transmitted to the writing processing unit 123, the image data is repeatedly expanded in the LD 154A in the writing processing unit 123, and writing is performed of the image onto the photosensitive member by the LD 154A. Thereafter, image data can be printed on the roll sheet RP by undergoing development, transfer, fixing, and the like.

In a case where the image forming apparatus 1 is used as a copying machine, information is transmitted such as a printing condition (print mode) set on the operation display unit 140, and setting information is prepared by the control CPU 113 and is stored in a storage unit such as the nonvolatile memory 115. Note that, a method for performing sweeping correction described later may be made selectable in the operation display unit 140.

In a case where the image forming apparatus 1 is used as a printer, the printing condition can be set by the printer driver in the external apparatus 3. Similarly to the image, the printing condition set here is transferred in the order of the external apparatus 3, the LAN interface 165, the image memory 162, the DRAM control IC 161 (controller), the DRAM control IC 111 (main body), and the page memory 122, and is stored in the page memory 122.

Next, a sweeping correction function will be described.

In the present invention, the sweeping correction method is not particularly limited.

In the case of a sheet-fed machine that performs image formation using a cut sheet, generally, in consideration of paper jam prevention and printing speed improvement, since an interval of about several tens of millimeters is provided between the sheets, by regarding an area outside the page as a white image, the sweeping correction can be appropriately performed. However, in the case of an image forming apparatus using a continuous sheet or a long sheet, since the interval between the pages (image interval) is often about 0 mm to 1 mm, if the area outside the page is assumed as a white image, as shown in FIGS. 17A to 17D, it is sometimes impossible to appropriately perform the sweeping correction. Hereinafter, a method will be described for performing the present invention. Note that, which method is to be selected may be set by a user via the operation display unit or the like, or the method to be selected on the basis of the image of each page may be selected by the control unit.

(Method 1)

In Method 1, by setting an area to which sweeping correction is applied, appropriate sweeping correction is implemented.

Specifically, as shown in a table of FIG. 3, sweeping correction is enabled at the front end of the first page, the rear end of the last page, and the inside of each page, and the sweeping correction is disabled at the rear end of the first page, the front end of the last page, and the front and rear ends of other pages, and processing is performed different from other data processing. As a result, the sweeping correction is not performed near a boundary of a page, and occurrence can be prevented of a streak at the boundary of the page.

Figure 4:
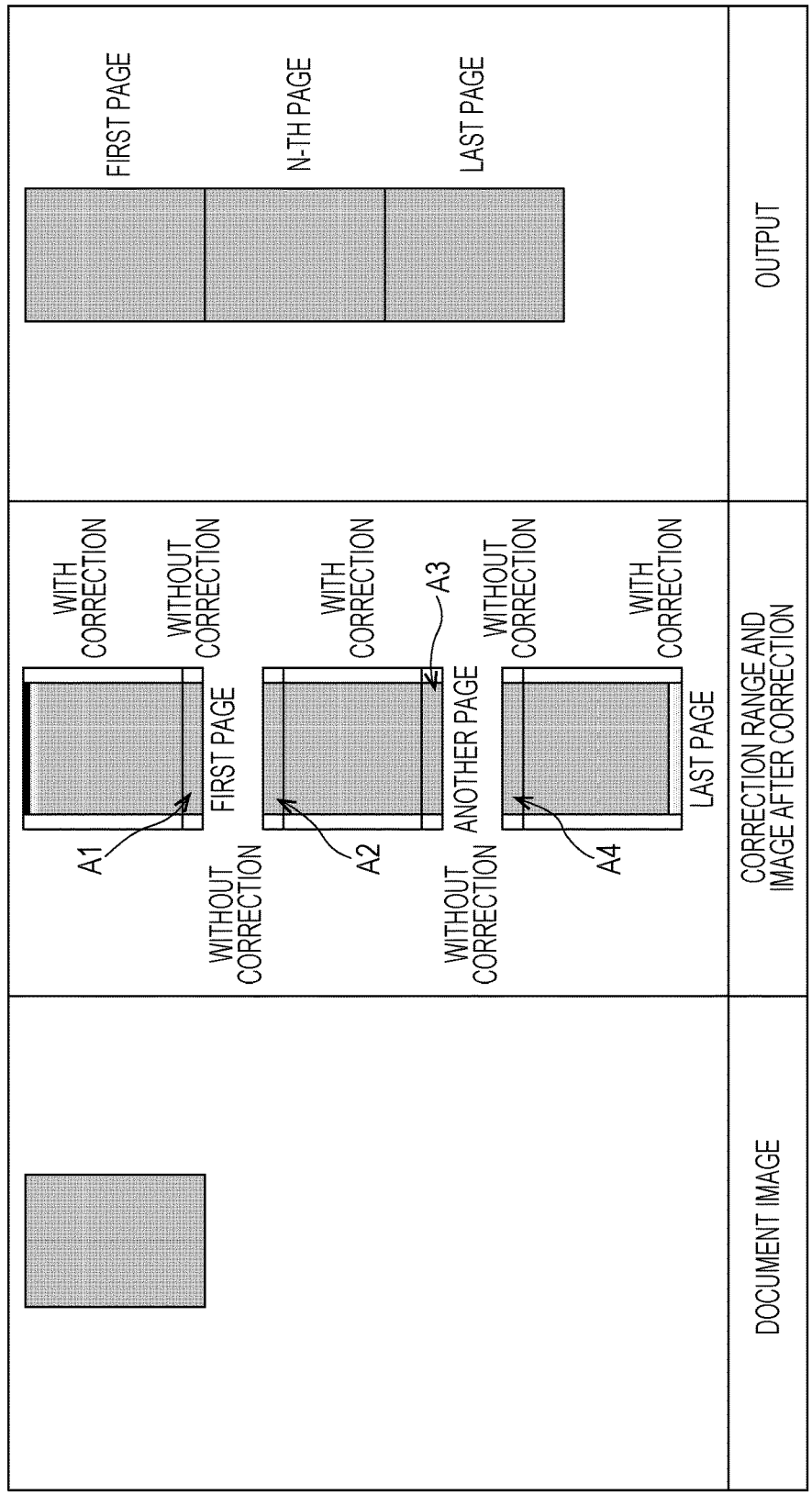
FIG. 4 is a diagram showing sweeping correction operation of Method 1.

FIG. 4 shows sweeping correction operation in a case where Method 1 is used.

In a method shown in FIG. 4, a printed matter is assumed having no image pattern change in a page boundary portion, for example, a case of a masking tape.

When a document image on the left side of FIG. 4 is printed, as shown in the central diagram of FIG. 4, a rear end area A1 of the first page, a front end area A4 of the last page, a front end area A2 and a rear end area A3 of another page each are set as an area not subjected to the sweeping correction, and the sweeping correction is performed in the other areas. As a result, the sweeping correction is not performed in a boundary area of the page, and as shown in the right diagram of FIG. 4, a streak does not occur near the page boundary.

Note that, the widths of the rear end areas A1 and A3 and the front end areas A2 and A4 can be used as reference widths of pixels during the sweeping correction. However, these widths may be different from each other.

By determining a correction target area as described above, it is possible to obtain an output to which the sweeping correction is appropriately performed.

Although FIG. 4 shows a case where the image density of the entire page is the same, even if the entire surface of the page does not have the same color, Method 1 is suitably applied in, for example, a case where the color of the boundary portion is continuous.

(Method 2)

In Method 1, the area near the page boundary is excluded from the sweeping correction.

However, in Method 1, in a case where the color is continuous at the page boundary, there is no problem because the sweeping phenomenon does not occur at the page boundary, but depending on the document, a sweeping image may be generated at the page boundary. Examples of an actual output include a case where a predetermined pattern is repeatedly printed, such as wrapping paper. In a case where Method 1 is applied to such a document, since the sweeping correction is not performed even though the sweeping phenomenon occurs in the boundary area of the image, image quality degradation occurs in the output due to the sweeping phenomenon.

Figure 5:
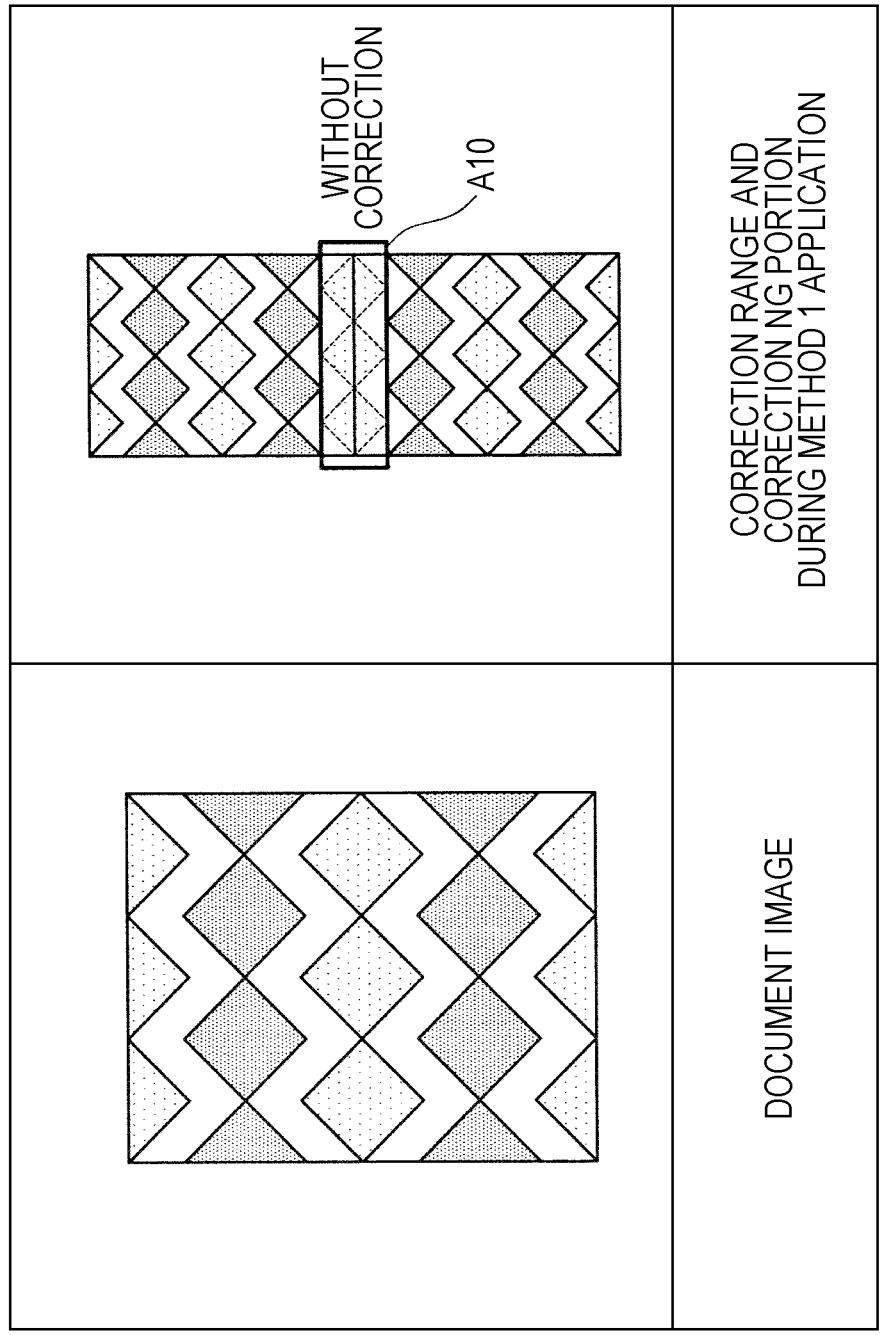
FIG. 5 is a diagram showing a problem when the sweeping correction of Method 1 is performed.

FIG. 5 shows an example in which a problem occurs in a case where Method 1 is used.

As shown in the left diagram of FIG. 5, in a case where a document image having a predetermined pattern is printed on a roll sheet, if Method 1 is applied and the sweeping correction is disabled in the boundary area of the page, the sweeping correction is not performed in a boundary area A10 of the page. As a result, a difference in image quality appears between the boundary area A10 and the other area where the sweeping correction is enabled, and quality of the output is degraded.

In Method 2, when the sweeping correction of the N-th page is performed, image data of the previous and next pages (page N−1 and page N+1) are used, and in an area where a pixel of another page exists, data is replaced with the pixel to perform the correction. As a result, the sweeping correction can be performed with reference to the image of the next page or previous page in the boundary area of the page, and appropriate sweeping correction can be performed.

(Method 3)

Note that, in Method 2, it is assumed that the image interval is 0; however, in a case where the image interval is small but not 0 mm, it is not possible to apply the correction by simply regarding the image of the N-th page and the image of the (N+1)-th page as continuous.

For that reason, in a case where the image interval is not 0 mm, the sweeping correction is performed assuming that a white image exists for the image interval in the area of the page boundary. As a result, the sweeping correction can be appropriately performed even in a case where a minute image interval exists.

In FIGS. 4 and 5 used in Methods 1 to 3, description has been made with a diagram that looks as if a density change is calculated with reference to the same width at the front and rear in the sheet feeding direction with respect to a pixel of interest, and the sweeping correction is performed on the basis of the calculated density change. However, in practice, it is not always necessary to calculate the density change with the same width at the front and rear in the sheet feeding direction.

Since the sweeping phenomenon is a physical phenomenon, depending on a configuration of the developing unit, the way the phenomenon appears may differ between the front end (low density to high density) and the rear end (high density to low density) of the figure. In such a case, the sweeping correction can be performed with reference to images with different widths in front and back in the sheet feeding direction.

FIGS. 6A to 6D show specific operation of the sweeping correction in a case where Method 2 and Method 3 are combined.

Figure 6A:
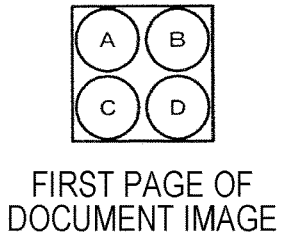
FIGS. 6A to 6D are diagrams showing a procedure of sweeping correction by Method 2 and Method 3.
Figure 6B:
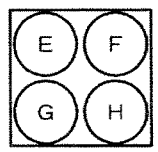

FIGS. 6A to 6D show a case where a job of two pages is output, and a case is assumed where an image in which letters A, B, C, and D are written respectively inside the four circles is used as the first page of the document image, as shown in FIG. 6A, and an image in which letters E, F, and H are written respectively inside the four circles is used as the second page of the document image, as shown in FIG. 6B.

When the sweeping correction is performed, it is assumed that a range is referenced of X mm in front and Y mm in back in the conveying direction from a pixel of interest, and an image interval between the pages is Z. In addition, it is assumed that a line including the pixel of interest as a correction target is a line of interest.

Figure 6C:
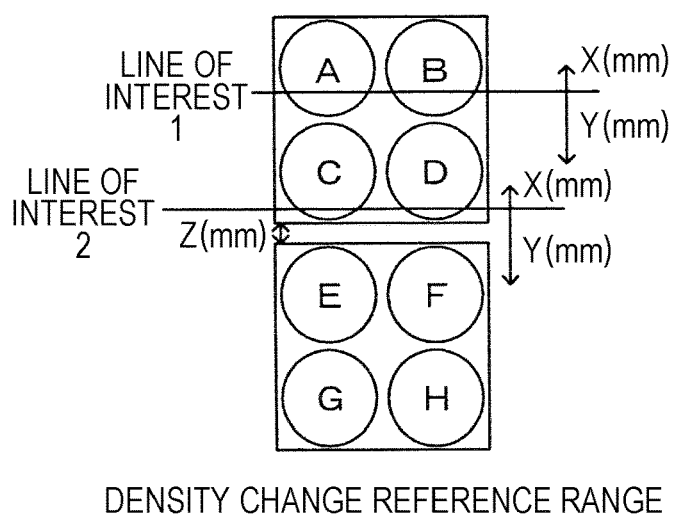

In this case, as shown in a density change reference range of FIG. 6C, since the area outside the page is not included in front or back of the line of interest 1, the sweeping correction is performed with reference to only the first page.

In a case where the sweeping correction is performed with a pixel of a line of interest 2, in the forward direction, only the first page is referenced, but in the backward direction, since a pixel of the second page and a margin are included in the reference range of the sweeping correction, the pixel of the second page is referenced, and the sweeping correction is performed by performing replacement with the pixel in an area where the pixel exists.

Figure 6D:
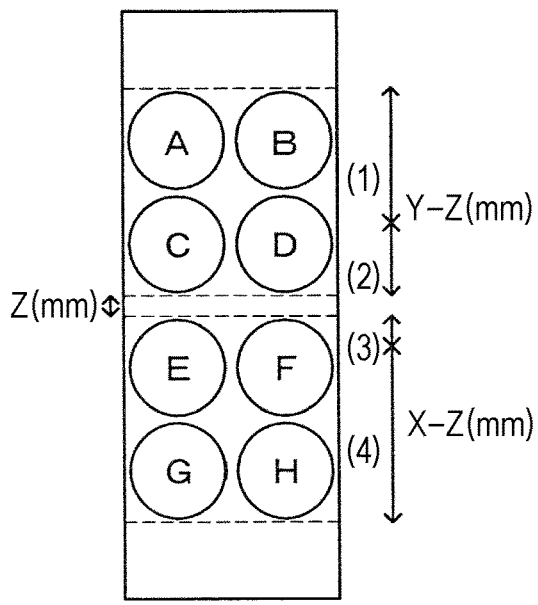

As a result, a correction method for each area is as shown in FIG. 6D.

As shown in FIG. 6D, in an area from the rear end of the first page to Y−Z mm and in an area from the front end of the second page to X−Z mm, the density change is calculated by using image data of the previous or next page. At this time, it is regarded that there is a white pixel of the image interval Z at the page boundary.

Then, in the other areas, the density change is calculated by regarding the outside of an image range of the page all as a white image, and the sweeping correction is performed. Here, the image data of the previous or next page is not used.

More detailed sweeping correction operation will be described with reference to FIGS. 7A to 7D.

Figure 7A:
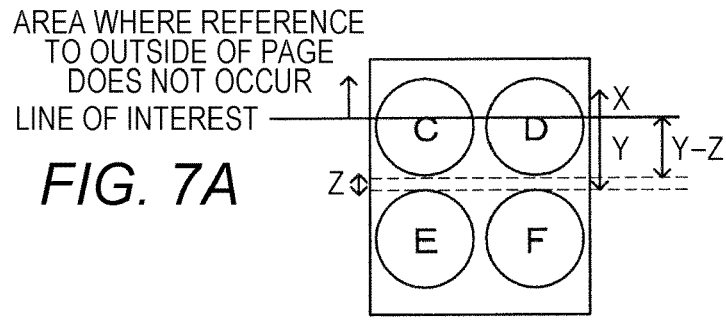
FIGS. 7A to 7D are diagrams showing detailed operation of the sweeping correction in Method 2 and Method 3.

FIG. 7A shows a case where it is the page rear end portion but reference does not occur to the outside of the page.

When the area from the rear end to Y−Z mm is regarded as a rear end area, in a case where the line of interest exists in an area in front of the rear end area, the area outside the page (area on the next page) is not referenced. In addition, a margin area between the images can be regarded as a white image.

Figure 7B:
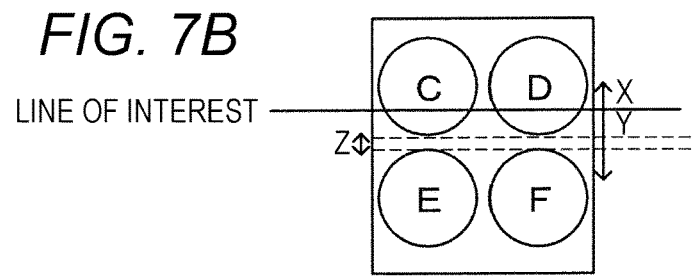

FIG. 7B shows a case where reference occurs to the next page.

In a case where the line of interest exists within the area from the rear end of the page to Y−Z mm, since an area of the next page is included within the reference width in back in the sheet feeding direction, the sweeping correction is performed with reference to the next page.

Figure 7C:
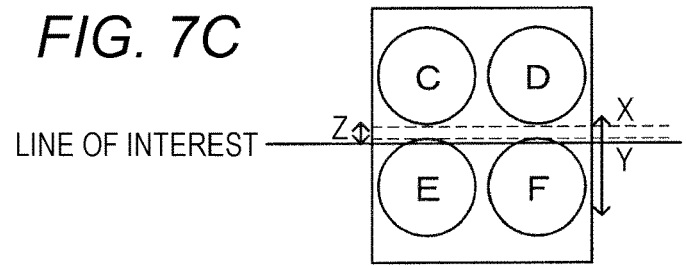

FIG. 7C shows a case where the line of interest exists within the area from the front end to X−Z mm, in the front end portion of the page. In this case, since a pixel area of the previous page is included within the reference width in front in the sheet feeding direction, the pixel of the previous page is referenced during the sweeping correction, and in that area, the correction is performed by performing replacement with the pixel of the previous page.

Figure 7D:
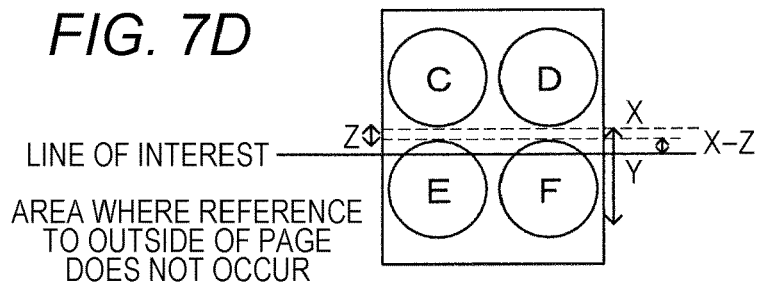

FIG. 7D shows a case where previous page reference does not occur, in the front end portion of the page. In the area after X−Z mm from the front end, since an area of the previous page is not included in the reference width of the sweeping correction, the sweeping correction is performed without referring to the previous page.

In this way, the sweeping correction is performed by referring to the area of the previous or next page within a range of Y−Z mm from the rear end of the page and within a range of X−Z mm from the front end of the page. As a result, the previous or next page can be referenced at the front end portion and the rear end portion while considering the image interval, and appropriate sweeping correction can be performed.

Figure 9:
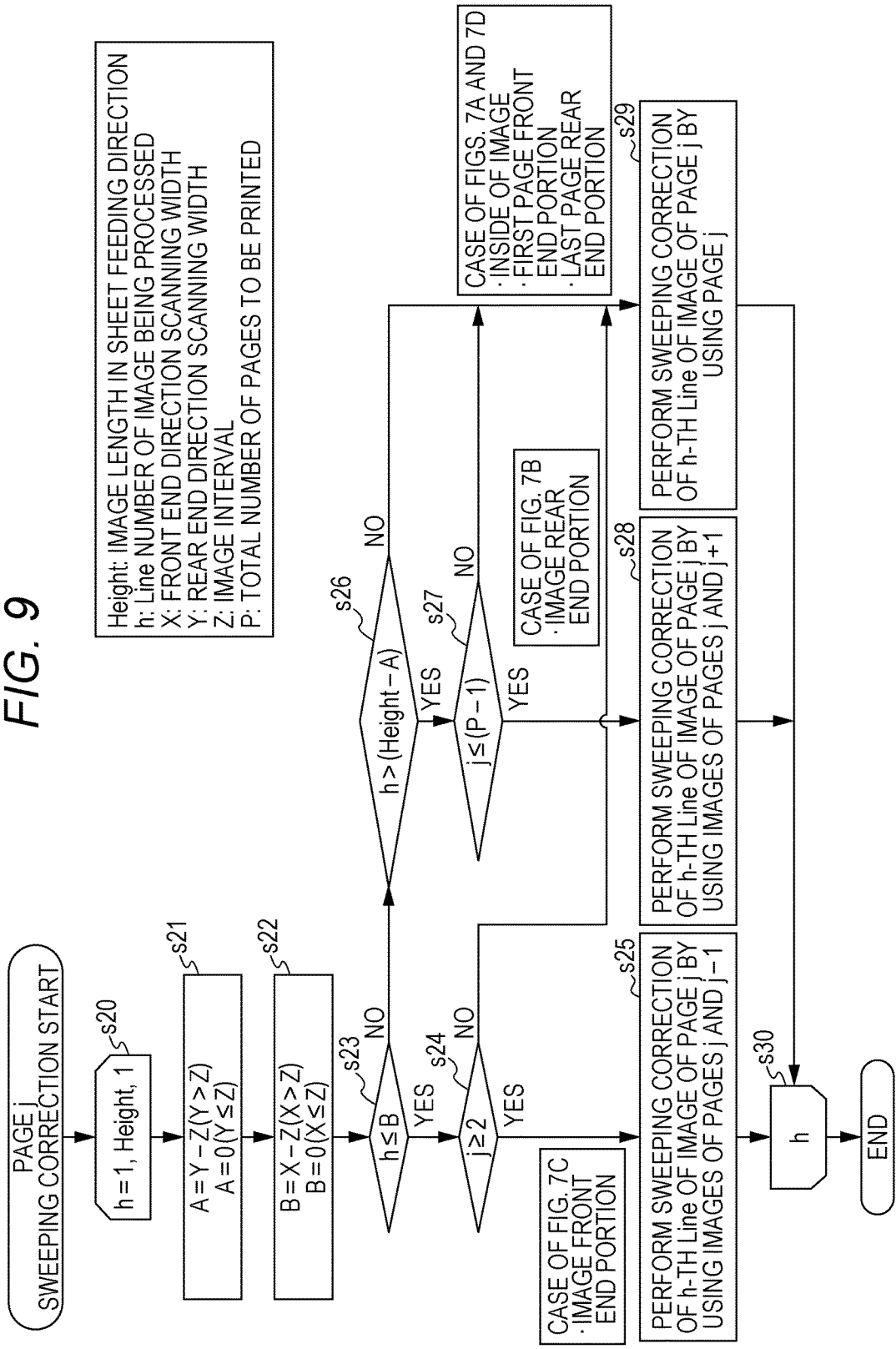
FIG. 9 is a flowchart showing a procedure of the sweeping correction by Method 2 and Method 3.
Figure 10:
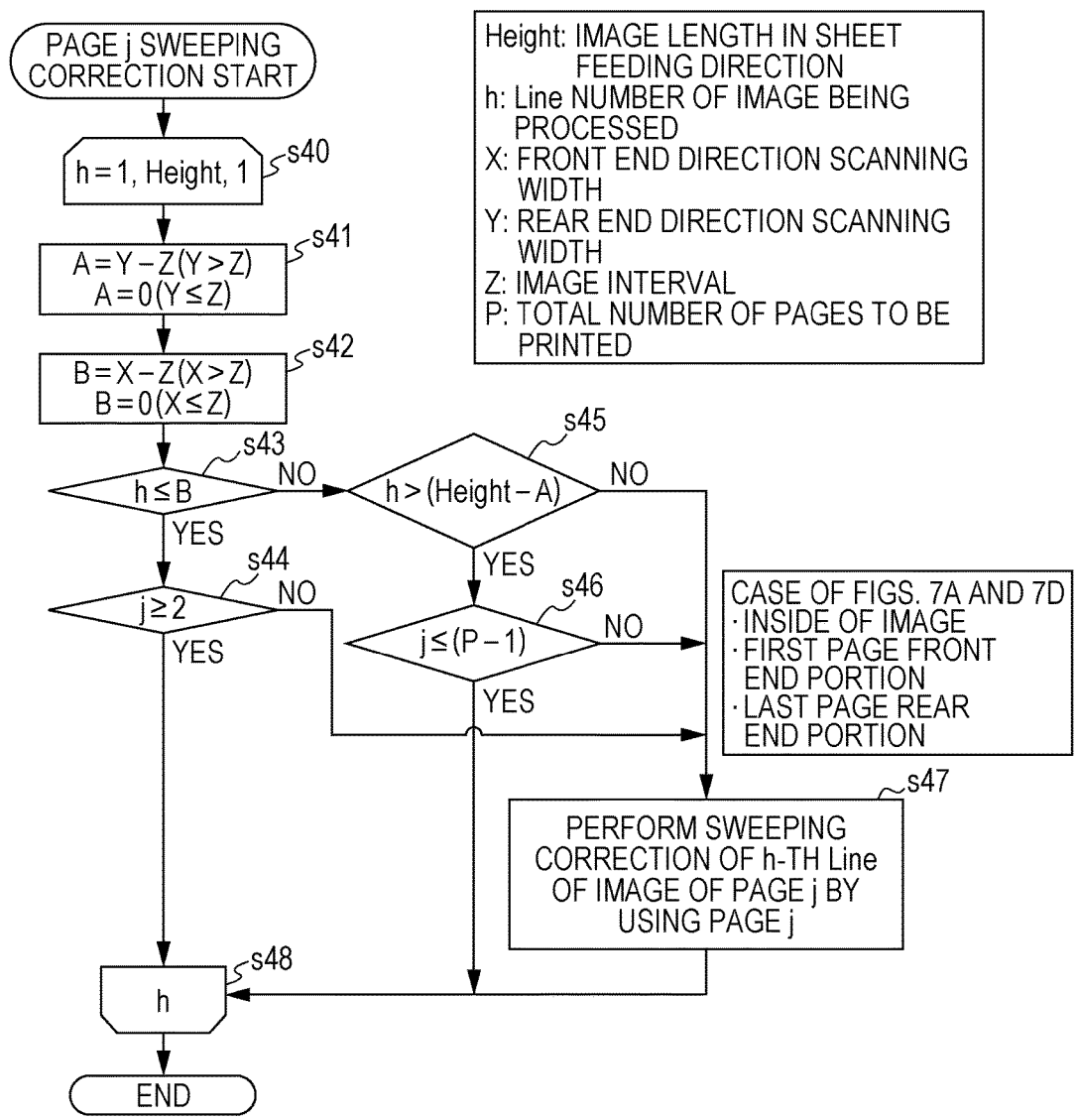
FIG. 10 is a flowchart showing a procedure of the sweeping correction by Method 1.

Detailed procedures of Method 1 to Method 3 will be described with reference to flowcharts of FIGS. 8 to 10. Note that, the following procedure is executed by the control of the control unit 105 or the external control unit 30.

Figure 8:
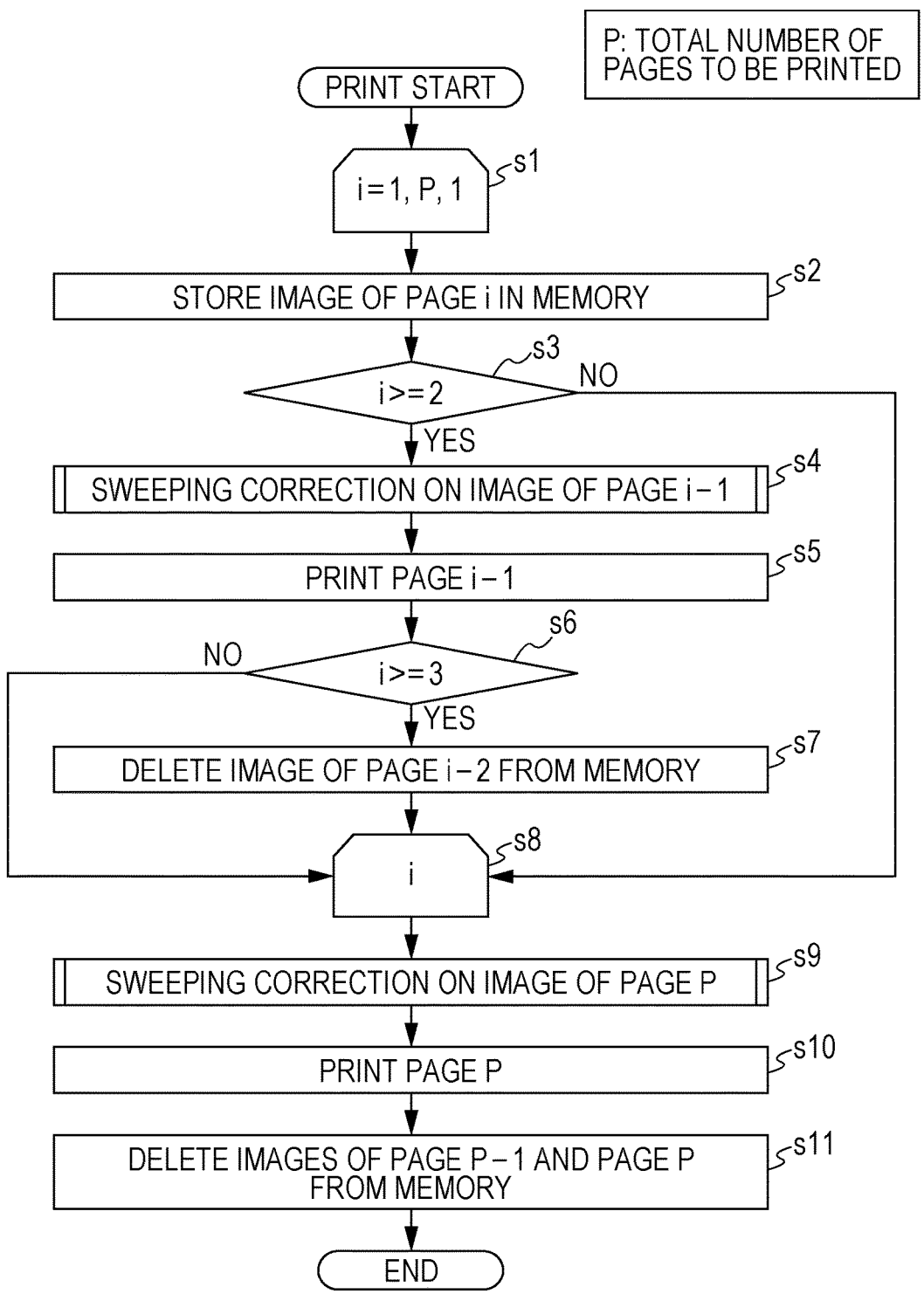
FIG. 8 is a flowchart showing a basic procedure of sweeping correction.

FIG. 8 is the flowchart showing a basic procedure of the sweeping correction of Method 1 to Method 3. In the present embodiment, when the sweeping correction of page i is performed, image data of page i−1 and page i+1 are required.

When printing is started, iterative processing is performed by setting the initial value i=1, the final value P (number of pages), and the increment to 1 (step s1).

First, an image of page i is stored in a memory (step s2), and it is determined whether i>=2 is satisfied (step s3).

In a case where i>=2 is not satisfied, the processing proceeds to step s8. In step s8, it is determined whether i is the final value P (step s8), and in a case where i=P is not satisfied, 1 is added to i, and the processing returns to step s1 and the iterative processing is performed.

If it is determined in step s3 that i>=2 is satisfied (step s3, Yes), the sweeping correction is performed on an image of page i−1 (step s4) and page i−1 is printed (step s5). Next, it is determined whether i>=3 is satisfied (step s6).

In a case where i>=3 is satisfied (step s6, Yes), an image of page i−2 is deleted from the memory (step s7), and the processing proceeds to step s8. In a case where i>=3 is not satisfied (step s6, No), the processing directly proceeds to step s8.

In a case where i=P is satisfied in step s8, the iterative processing is exited and the sweeping correction is performed on page P (step s9). Next, page P is printed (step s10), images of page P−1 and page P are deleted from the memory, and the procedure is ended.

Next, procedures of the sweeping correction of Methods 2 and 3 will be described with reference to the flowchart of FIG. 9.

Here, Height is an image length in the sheet feeding direction, h is a Line number of an image being processed, X is a front end direction scanning width, Y is a rear end direction scanning width, Z is an image interval, and P is a total number of pages to be printed.

The sweeping correction of page j is started, and iterative processing is performed of the Line number of the image being processed up to Height at the increment of 1 (step s20).

In a case where Y>Z is satisfied, A=Y−Z is set, and in a case where Y≤Z is satisfied, A=0 is set (step s21). Next, the processing proceeds to step s21.

In a case where X>Z is satisfied, B=X−Z is set, and in a case where X≤Z is satisfied, B=0 is set (step s22).

In steps s21 and s22, it is set whether an image area of another page is referenced during the sweeping correction.

After step s22, it is determined whether the Line number of the image being processed h satisfies h≤B (step s23). If h≤B is satisfied (step s23, Yes), it is determined whether j≥2 is satisfied for page j being processed (step s24), and If j≥2 is satisfied (step s24, Yes), the sweeping correction is performed of the h-th Line of an image of page j by using images of page j and page j−1 (step s25). Step s25 corresponds to the case of FIG. 7C in the image front end portion.

In a case where j≥2 is not satisfied in step s24 (step s24, No), it is the front end portion of the first page, and the sweeping correction is performed of the h-th Line of the image of page j by using page j (step s29). This corresponds to FIG. 7A.

In step s23, in a case where h≤B is not satisfied (step s23, No), it is determined whether h>Height−A is satisfied (step s26). In a case where h>Height−A is satisfied (step s26, Yes), it is determined whether j≤P−1 is satisfied (step s27). In a case where j≤P−1 is satisfied (step s27, Yes), the sweeping correction is performed of the h-th Line of the image of page j by using page j and page j+1 (step s28). This corresponds to the case of the image rear end portion of FIG. 7B.

In a case where h>Height−A is not satisfied in step s26 (step s26, No), it is determined that it is inside the image, and the sweeping correction is performed of the h-th Line of page j by using page j (step s29). This corresponds to FIG. 7D. In addition, in a case where j≤P−1 is not satisfied in step s27 (step s27, No), it is the rear end portion of the last page, so that the processing proceeds to step s29, and the sweeping correction is performed of the h-th Line of page j by using page j (step s29). This corresponds to FIG. 7D.

After the sweeping correction is performed in step s25, step s28, or step s29, the processing proceeds to step s30 and it is determined whether h is the final value (step s30), and If it is not the final value, 1 is added to h and the processing returns to step s20, and the procedure is repeated. If it is the final value, the procedure is ended.

By the above procedure, the sweeping correction can be performed by referring to the image of the other page, in the rear end portion of the first page, the front end portion of the last page, and the front end portion and the rear end portion of the other page, and appropriate sweeping correction can be implemented.

Next, a procedure of Method 1 will be described with reference to the flowchart of FIG. 10. The procedure of Method 1 is a flow in which the sweeping correction processing of a portion referring to the previous or next page is deleted from the flowchart of FIG. 9.

Here, Height is an image length in the sheet feeding direction, h is a Line number of an image being processed, X is a front end direction scanning width, Y is a rear end direction scanning width, Z is an image interval, and P is a total number of pages to be printed.

The sweeping correction of page j is started, and iterative processing is performed by setting, for h as the Line number of the image to be processed, the initial value to h=1, the final value to Height (image length in the sheet feeding direction), and the increment to 1 (step s40).

In the case of Y>Z, A=Y−Z is set, and in the case of Y≤Z, A=0 is set (step s41).

In the case of X>Z, B=X−Z is set, and in the case of X≤Z, B=0 is set (step s42).

After step s42, it is determined whether h≤B is satisfied for the Line number h of the image being processed (step s43). If h≤B is satisfied (step s43, Yes), it is determined whether j≥2 is satisfied for page j being processed (step s44), and If j≥2 is satisfied (step s44, Yes), it is determined whether h has reached Height, and If h has not reached Height, 1 is added to h and the processing returns to step s40. If h has reached Height, the procedure is ended.

If j≥2 is not satisfied (step s44, No), the sweeping correction is performed of the h-th Line of page j by using page j (step s47), and then the processing proceeds to step s48.

In step s43, if h≤B is not satisfied (step s43, No), it is determined whether h>Height−A is satisfied (step s45). If h>Height−A is satisfied (step s45, No), it is an area inside the image, so that the sweeping correction is performed of the h-th Line of page j by using page j (step s47).

In a case where h>Height−A is satisfied (step s45, Yes), it is determined whether j≤P−1 is satisfied (step s46). In a case where j≤P−1 is satisfied (step s46, Yes), the processing proceeds to step s48.

In a case where j≤P−1 is not satisfied (step s46, No), the sweeping correction is performed of the h-th Line of page j by using page j (step s47). Step s47 corresponds to processing in the inside of the image, the front end portion of the first page, or the rear end portion of the last page, and corresponds to the cases of FIGS. 7A and 7D. After step s47, the processing proceeds to step s48.

In step s48, it is determined whether h has reached Height, and If h has not reached Height, 1 is added to h, and the processing returns to step s40 and the iterative processing is performed. In step s48, if h has reached Height, the procedure is ended.

According to the above procedure, the sweeping correction is performed inside the image, at the front end portion of the first page, and at the rear end portion of the last page, and the sweeping correction is not performed in the rear end portion of the first page, the front end portion of the last page, and the front end portion and the rear end portion of the other page, so that the sweeping correction can be appropriately performed even in a case where the image interval is narrow.

Note that, which one of the methods 1 to 3 is to be used may be made settable by the user on the operation display unit 140, or the control unit may automatically determine the optimum method.

For example, Method 1 may be applied in a case where image data of a job has no image pattern change in the page boundary portion and has no image interval, and Method 2 or Method 3 may be applied in other cases. In the present invention, a method for selecting Methods 1 to 3 is not particularly limited.

(Method 4)

In Methods 2 and 3 above, the sweeping correction is performed by using the previous or next page image, in the area near the boundary of the page. For that reason, in a case where these methods are used, as shown in the flowchart of FIG. 8, images of page N−1 and page N+1 are required during printing of page N. However, in order to implement the above methods, it is necessary to delay image deletion by one page, or to delay a printing start by one page, and there is a problem that control becomes complicated.

In an image forming apparatus using a roll sheet, an application is assumed in which an image is printed with a fixed pattern without a variable portion like a wine label. In such a case, since it is operation to print 10000 copies of one page, page N, page N−1 and page N+1 are the same images.

Therefore, in Method 4, the sweeping correction is performed by performing replacement of pixels by using an image of the current page (page N) instead of an image of the next page (page N+1) or the previous page (page N−1).

In addition, in a case where a partially changed image is repeatedly printed like variable printing, for example, in a case where output is performed for 10000 pages, one copy of 10000 pages is output, but the images of the pages are the same except for the variable portion. For that reason, similarly to a case where the same page is repeatedly printed, it can be expected that substantially correct correction can be obtained even if the image of page N is used instead of the page N+1 or N−1.

Note that, application of Method 4 is not limited to a case where plural copies of the same page are output, or a case where variable printing is performed. In the present invention, Method 4 can be applied as long as it is a job in which the same or similar images are arranged at least near the front end and near the rear end of the page, in each page.

FIGS. 11A to 11D are diagrams showing an example of sweeping correction operation by Method 4.

Figure 11A:
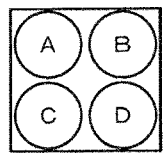
FIGS. 11A to 11D are diagrams showing sweeping correction operation by Method 4.
Figure 11B:
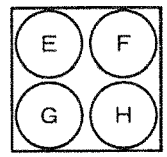

Here, variable printing is assumed, and as shown in FIGS. 11A and 11B, the document image is a document image on which four circles are arranged, and the central portion of each circle is a variable area. In the image of the first page, letters A, B, C, and D are written in the respective circles, and in the image of the second page, the letters E, F, and H are written in the respective circles.

Figure 11C:
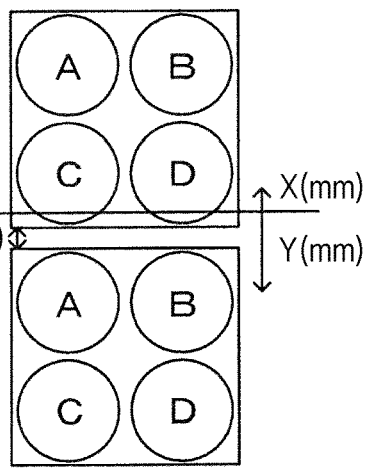

In a case where the sweeping correction is performed for this job, as shown in FIG. 11C, the correction is performed by using a pseudo original image using the image of the first page as the image of the second page. Then, the sweeping correction is performed assuming that the same image as the first page exists on the next page.

Figure 11D:
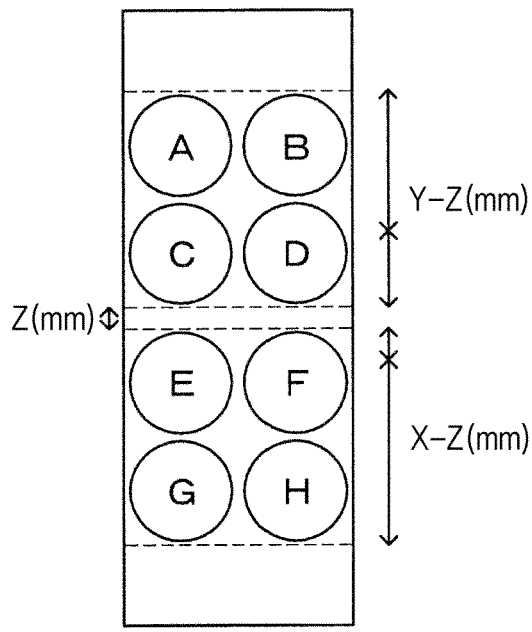

Thereafter, by printing the image after the correction, the output shown in FIG. 11D is obtained.

In this way, originally the density change should be calculated with reference to page 2 in the rear end portion of page 1, but the density change is calculated assuming that page 1 is repeated as shown in FIG. 11C, and the sweeping correction is performed on the basis of the calculated density change.

Figure 12:
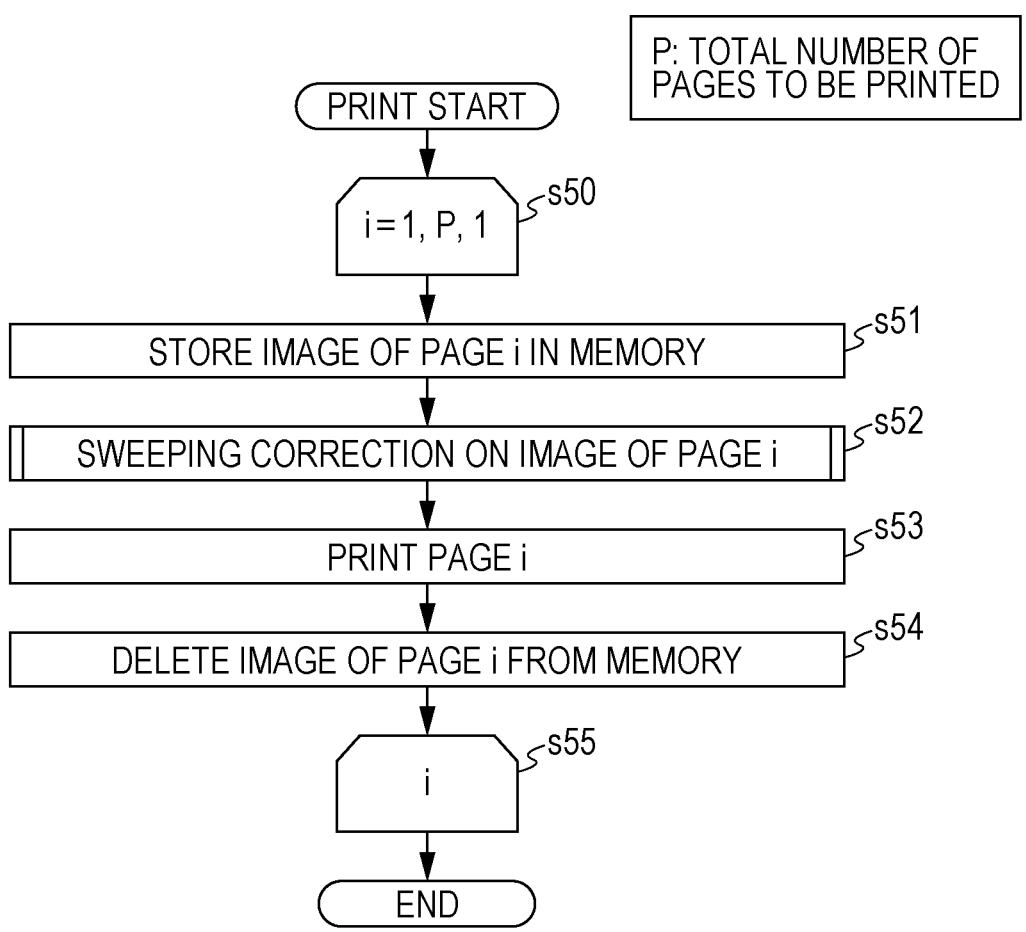
FIG. 12 is an overall flowchart of the sweeping correction of Method 4.
Figure 13:
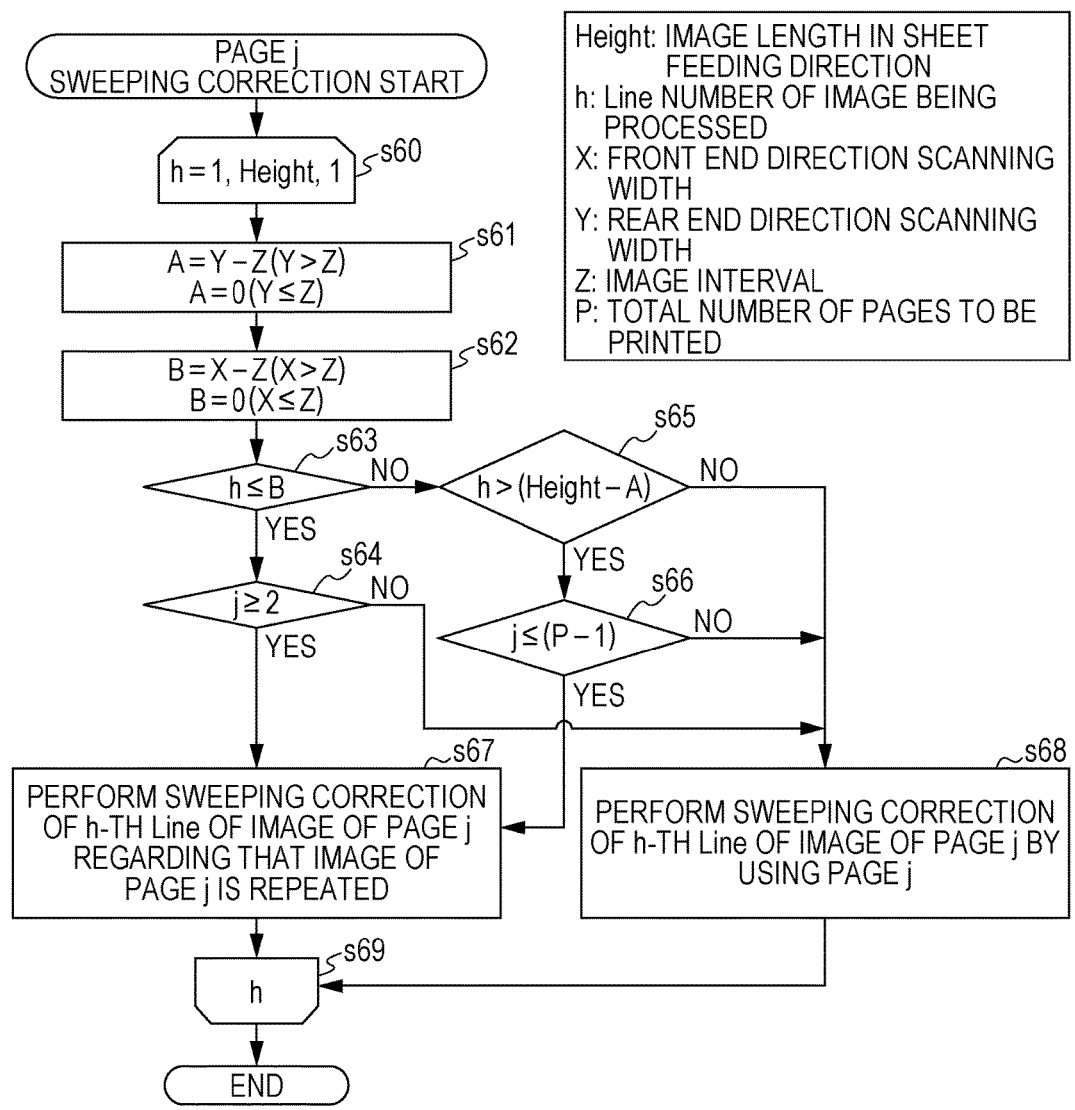
FIG. 13 is a flowchart showing a procedure of the sweeping correction by Method 4.

Next, a detailed procedure of the sweeping correction by Method 4 will be described with reference to flowcharts of FIGS. 12 and 13.

Method 4 is simple control compared with Methods 2 and 3, and processing can be performed independently for each page.

First, the overall flow of Method 4 will be described with reference to FIG. 12. Note that, the following procedure is executed by the control of the control unit 105 or the external control unit 30.

When printing is started, iterative processing is performed in which the initial value i=1, the final value P (the total number of pages to be printed), and the increment 1 are set (step s50).

An image of page i is stored in a memory (step s51), and the sweeping correction is performed on the image of page i (step s52). Then, page i is printed (step s53), and thereafter, the image of page i is deleted from the memory (step s54). Next, it is determined whether i is the final value (step s55), and If i is not the final value P, 1 is added to i, and the processing returns to step s50, and If i is the final value, the procedure is ended.

Next, a procedure of the sweeping correction operation by Method 4 will be described with reference to the flowchart of FIG. 13. Note that, the following procedure is executed by the control of the control unit 105 or the external control unit 30.

Here, Height is an image length in the sheet feeding direction, h is a Line number of an image being processed, X is a front end direction scanning width, Y is a rear end direction scanning width, Z is an image interval, and P is a total number of pages to be printed.

The sweeping correction of page j is started, and iterative processing is performed by setting, for the Line number h of the image being processed, the initial value to h=1, the final value to Height (image length in the sheet feeding direction), and the increment to 1 (step s60).

In a case where Y>Z is satisfied, A=Y−Z is set, and in a case where Y≤Z is satisfied, A=0 is set (step s61).

In a case where X>Z is satisfied, B=X−Z is set, and in a case where X≤Z is satisfied, B=0 is set (step s62).

After step s62, it is determined whether h≤B is satisfied for the Line number h of the image being processed (step s63). If h≤B is satisfied (step s63, Yes), it is determined whether j≥2 is satisfied for page j being processed (step s64), and If j≥2 is satisfied (step s64, Yes), the sweeping correction is performed of the h-th Line of page j assuming that the image of page j is repeated (step s67).

If j≥2 is not satisfied (step s64, No), the sweeping correction is performed of the h-th Line of page j by using page j (step s68).

In a case where h≤B is not satisfied in step s63 (step s63, No), it is determined whether h>Height−A, and it is determined whether h is in the rear end portion of the page (step s65).

If h>Height−A is not satisfied (step s65, No), since it is an area inside the image, the sweeping correction is performed of the h-th Line of page j by using page j (step s68).

In a case where h>Height−A is satisfied (step s65, Yes), it is determined whether j≤P−1 is satisfied (step s66). In a case where j≤P−1 is satisfied (step s66, Yes), the sweeping correction is performed of the h-th Line of the image of page j assuming that the image of page j is repeated (step s67).

In a case where j≤P−1 is not satisfied (step s66, No), the sweeping correction is performed of the h-th Line of page j by using page j (step s68).

After step s67 or step s68, it is determined whether h is the final value (step s69), and If h is not the final value Height, 1 is added to h, and the processing returns to step s60. If h is the final value Height, the procedure is ended.

According to the above procedure, the sweeping correction can be performed appropriately by easy control when repeated printing of the same page or variable printing is performed.

(Method 5)

Although the above Method 4 is easy to control, there is a problem that appropriate correction cannot be performed in a case where the variable portion is arranged at the page front end or rear end.

Therefore, in Method 5, the RIP processing is performed such that the document image includes the previous and next page front end and rear end, and the sweeping correction is applied during printing, and thereafter areas corresponding to the previous and next pages are trimmed and printing is performed. As a result, appropriate sweeping correction can be performed by the method even in a case where the variable portion is arranged at the page front end or rear end.

FIGS. 14A to 14D show operation of the sweeping correction by Method 5.

Figure 14A:
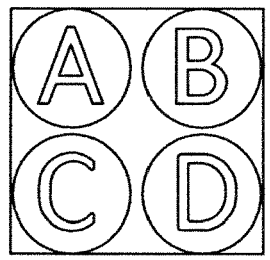
FIGS. 14A to 14D are diagrams showing operation of sweeping correction of Method 5.
Figure 14B:
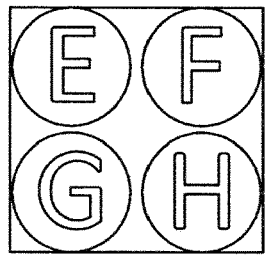
Figure 14C:
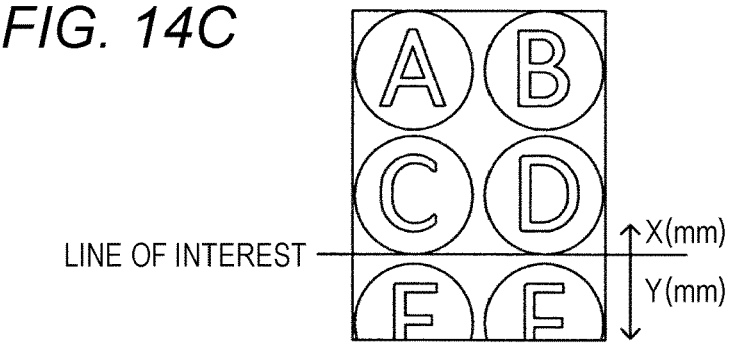
Figure 14D:
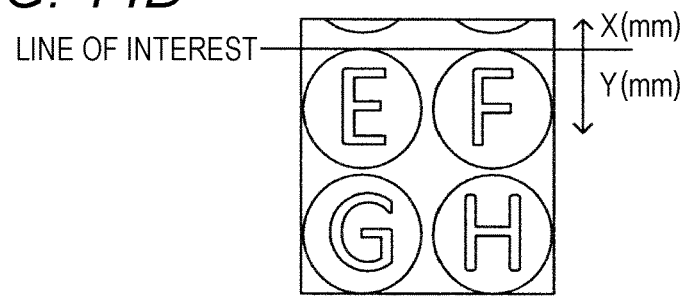

In a case where the image of FIG. 14A is the first page of the document and the image of FIG. 14B is the second page of the document, when the RIP processing of the image of the first page is performed, the RIP processing is performed such that the front end portion of the second page is included, as shown in FIG. 14C. In addition, when the RIP processing of the image of the second page, the RIP processing is performed such that the rear end portion of the first page is included, as shown in FIG. 14D.

Then, the sweeping correction is performed on the image after the RIP processing, and after the sweeping correction, the image on the next page or the previous page is trimmed so that the image outside the page is not printed. Note that, FIGS. 14A to 14D show a case where the job includes two pages in total, and in a case where a job of three or more pages is output, the RIP processing is performed such that the rear end portion of the previous page and the front end portion of the next page are included in pages other than the first page and the last page.

According to Method 5, by including the image of the previous or next page in the image after the RIP processing itself, correct sweeping correction can be performed by using only the single image without reference to the image of other pages.

Note that, the width of the previous or next page image to be added only needs to be greater than or equal to the reference width in the sweeping correction. For example, in the sweeping correction, in a case where the density is calculated with reference to the width of X mm in the front end direction and Y mm in the rear end direction, the RIP processing is performed such that the rear end portion of the previous page of X mm and the front end portion of the next page of Y mm are included, whereby appropriate sweeping correction can be performed. In addition, in a case where an image interval exists, it is sufficient that the image of the previous or next page is included with the width in consideration of the image interval. After the sweeping correction, the images of other pages are trimmed.

Next, a detailed procedure of Method 5 will be described with reference to a flowchart of FIG. 15. Note that, the following procedure is executed by the control of the control unit 105 or the external control unit 30.

Here, X is a front end direction scanning width, Y is a rear end direction scanning width, Z is an image interval, and P is a total number of pages to be printed.

Printing is started, and iterative processing is performed by setting the initial value of the number of pages i to 1, the final value to P, and the increment to 1 (step s70).

First, it is determined whether i=1 is satisfied (step s71). In a case where i=1 is satisfied (step s71, Yes), the image of page i is subjected to the RIP processing such that the image of page i+1 is included with width Y–Z at the rear end of page i (step s72).

In a case where i=1 is not satisfied (step s71, No), it is determined whether i=P is satisfied (step s73).

In a case where i=P is satisfied (step s73, Yes), the image of page i is subjected to the RIP processing (step s74) such that the image of page i–1 is included with width X–Z at the front end of page i.

In a case where i=P is not satisfied (step s73, No), the image of page i is subjected to the RIP processing such that the image of page i–1 that is the previous page is included with width X–Z at the front end of page i, and the image of page i+1 that is the next page is included with width Y–Z at the rear end of page i (step s75).

After steps s72, s74, and s75, the sweeping correction is performed on the image of page i (step s76).

Thereafter, it is determined again whether i=1 is satisfied (step s77). In a case where i=1 is satisfied (step s77, Yes), the area of the width Y–Z of the rear end of the image of page i is trimmed, and page i is printed (step s78).

In a case where i=1 is not satisfied (step s77, No), it is determined whether i=P is satisfied (step s78). In a case where i=P is satisfied (step s79, Yes), the area of width X–Z at the front end of the image of page i is trimmed, and page i is printed (step s80), and in a case where i=P is not satisfied (step s73, No), the areas of the width X–Z of the front end and the width Y–Z of the rear end of the image of page i are trimmed, and page i is printed (step s81), and after the steps s78, s80, and s81, the image of page i is deleted from the memory (step s82). Then, it is determined whether i is the final value (step s83), and If i is not the final value, 1 is added to i, and the processing returns to step s70, and If i is the final value, the procedure is ended.

According to the above procedure, since the image after the RIP processing includes the page image of the previous or next page, even in a case where the image of the other page is referenced during the sweeping correction, the correction can be performed appropriately.

Figure 15:
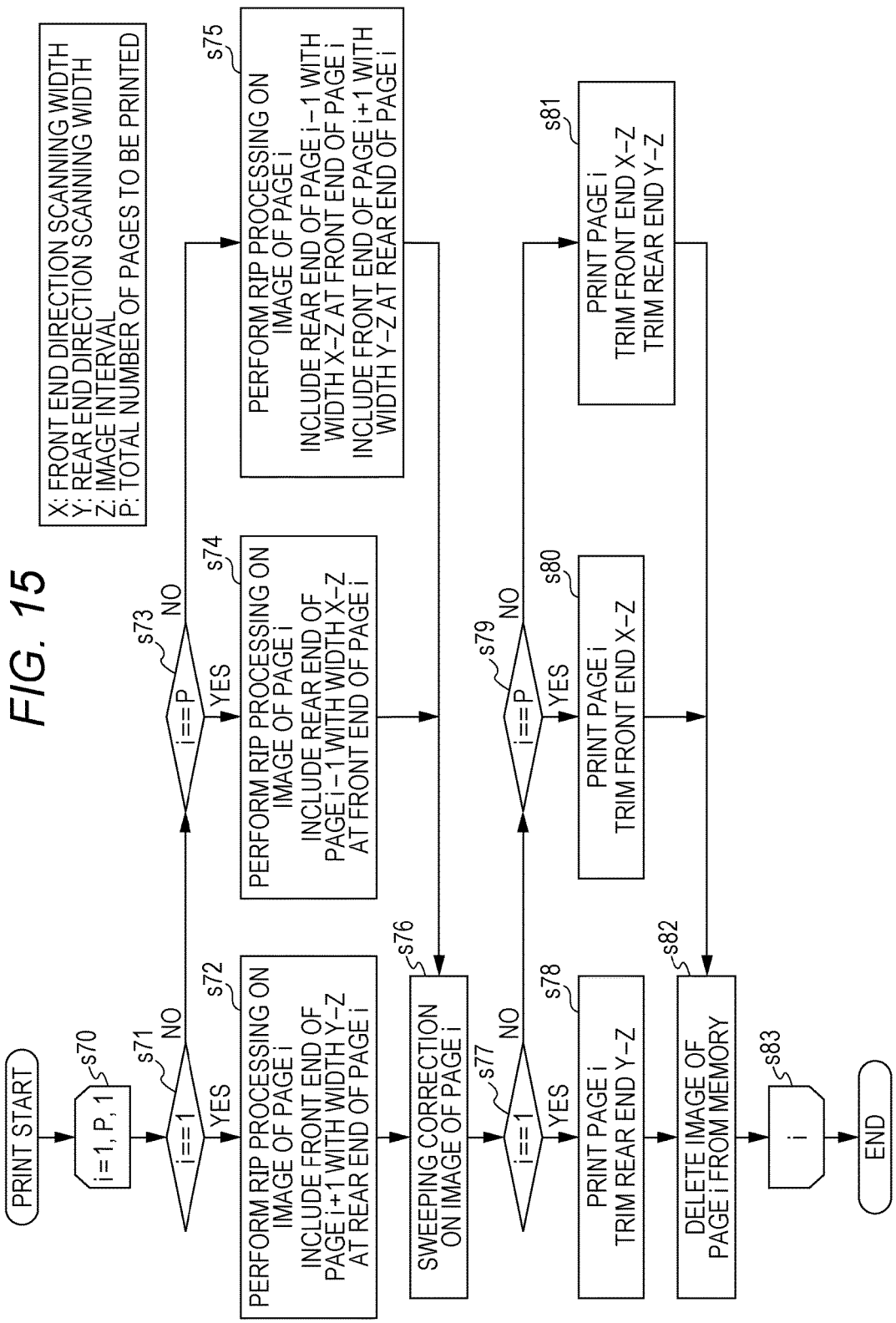
FIG. 15 is a flowchart showing a procedure of the sweeping correction of Method 5.
Figure 16A:
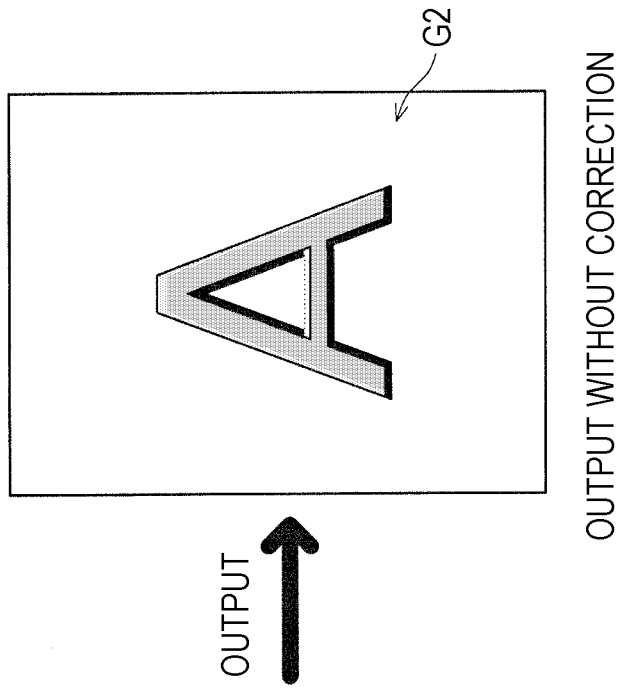
FIGS. 16A and 16B are diagrams showing an example of a sweeping phenomenon.
Figure 16B:
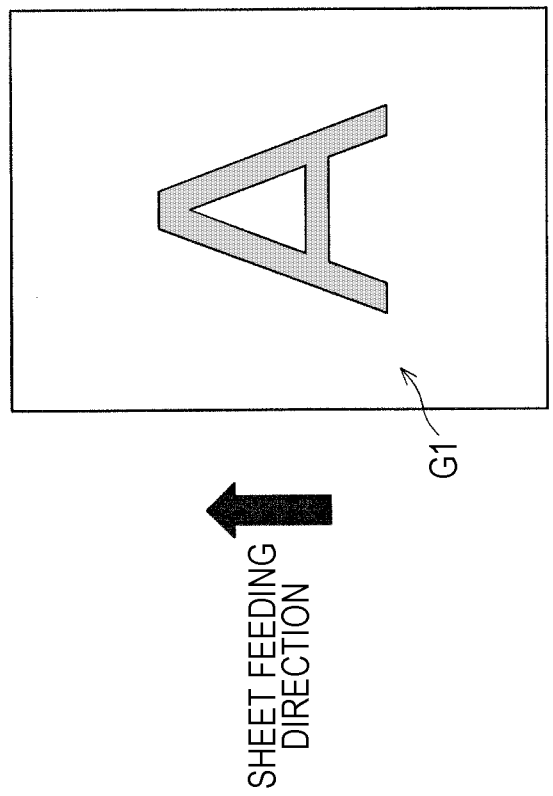

Note that, in the flowchart of FIG. 15, printing is performed while the RIP processing is performed; however, the timing of the RIP processing is not particularly limited, and all pages may be subjected to the RIP processing in advance before printing.

According to the present embodiment, it becomes possible to appropriately perform the sweeping correction at the page boundary when the image is formed by narrowing the image interval.

Note that, in the above description, the case has been described where the image is formed with plural pages on the continuous sheet such as the roll sheet; however, the type of the transfer medium to which the present invention is applied is not limited to the continuous sheet such as the roll sheet, but it may be a long sheet on which plural pages are continuously formed in the conveying direction.

Although embodiments of the present invention have been described and illustrated in detail, the disclosed embodiments are made for purposes of illustration and example only and not limitation, and it is possible to make appropriate changes to the above-described embodiments as long as not departing from the scope of the present invention. The scope of the present invention should be interpreted by terms of the appended claims.

What is claimed is:

1. An image processing apparatus, wherein the image processing apparatus is configured to output a plurality of page images continuously in a conveying direction on a sheet, and the image processing apparatus comprises
a hardware processor that performs data processing on the images on a page basis, wherein
the hardware processor, upon the data processing, obtains a density change of each of the images with reference to a pixel of each of the images within a predetermined width in the conveying direction of the sheet, and, based on the density change, performs density correction of each of the images on a pixel basis within a page, and
wherein in a case where image formation of N pages is performed, wherein N is greater than or equal to 2,
when the density change is obtained for a pixel at a rear end of an image of a page M', a pixel at a front end of an image of a page M'+1 is used, wherein M' is 1 to N−1; and
when the density change is obtained for a pixel at a front end of an image of a page L', a pixel at a rear end of an image of a page L'−1 is used, wherein L' is 2 to N.

2. The image processing apparatus according to claim 1, wherein
in a case where an area outside the page is within the predetermined width in the conveying direction and the area does not include a pixel of a previous or next page, the hardware processor performs the data processing by regarding the area as a white pixel.

3. The image processing apparatus according to claim 1, wherein
in a case where an area outside the page is within the predetermined width in the conveying direction and the area includes a pixel of a previous or next page, the hardware processor performs the density correction by replacing the area with a pixel of the previous or next page or a current page.

4. The image processing apparatus according to claim 1, wherein
the predetermined width has different lengths between at a front end and a rear end in the conveying direction of the sheet.

5. The image processing apparatus according to claim 1, wherein
in a case where an identical image exists near a front end and near a rear end of an image of each page, the hardware processor uses an image of a current page as an image outside the page upon the density correction.

6. The image processing apparatus according to claim 1, wherein
in a case where output is a repetition of an identical page, the hardware processor uses an image of a current page as an image outside the page upon the density correction.

7. The image processing apparatus according to claim 1, wherein
in a case where output is variable printing, the hardware processor uses an image of a current page as an image outside the page upon the density correction.

8. The image processing apparatus according to claim 1, wherein
in a case where the predetermined width has a width of X toward a conveying direction front end and Y toward a conveying direction rear end from each pixel, and output is performed with an image interval Z between pages, and image formation of N pages is performed, wherein N is greater than or equal to 2,
when Z<Y,
when the density change is obtained for a pixel of a width Y−Z from a rear end of an image of a page M, a pixel of an image of a page M+1 is used and it is assumed that a white pixel of the image interval Z exists between pages, wherein M is 1 to N−1, and
when Z<X,
when the density change is obtained for a pixel of a width X−Z from a front end of an image of a page L, an image of a page L−1 is used and it is assumed that a white pixel of the image interval Z exists between pages, wherein L is 2 to N.

9. The image processing apparatus according to claim 1, wherein
in a case where the predetermined width has a width of X toward a conveying direction front end and Y toward a conveying direction rear end from each pixel, and output is performed with an image interval Z between pages, and image formation of N pages is performed, wherein N is greater than or equal to 2,
when Z<Y,
when the density change is obtained for a pixel of a width Y−Z from a rear end of an image of a page M, the image of the current page M is repeated and it is assumed that a white pixel of the image interval Z exists between pages, wherein M is 1 to N−1, and
when Z<X,
when the density change is obtained for a pixel of a width X−Z from a front end of an image of a page L, the image of the current page L is repeated and it is assumed that a white pixel of the image interval Z exists between pages, wherein L is 2 to N.

10. The image processing apparatus according to claim 1, wherein
in a case where image formation of N pages is performed, output is performed with an image interval Z between pages.

11. An image processing apparatus, wherein the image processing apparatus is configured to output a plurality of page images continuously in a conveying direction on a sheet, and the image processing apparatus comprises
a hardware processor that performs data processing on the images on a page basis, wherein
the hardware processor, upon the data processing, obtains a density change of each of the images with reference to a pixel of each of the images within a predetermined width in the conveying direction of the sheet, and, based on the density change, performs density correction of each of the images on a pixel basis within a page, and
in a case where a pixel outside the page is included within the predetermined width in the conveying direction, data processing different from the density correction is performed,
the hardware processor, upon the data processing, further performs expansion of image data to cause a part of an area outside the page to be included, and after the expansion of the image data, performs the density correction, and after the density correction, trims the area outside the page in the image data after the expansion of the image data.

12. The image processing apparatus according to claim 11, wherein
in a case where the predetermined width has a width of X toward a sheet feeding direction front end and Y toward a sheet feeding direction rear end from each pixel, and pages are output at a predetermined image interval Z on the sheet, and image formation of N pages is performed, wherein N is greater than or equal to 2,
when Z<Y,
an image data front end of a page M+1 of a width of greater than or equal to Y−Z is given to an image data rear end of a page M, wherein M is 1 to N−1, and
when Z<X,
an image data rear end of a page L−1 of a width of greater than or equal to X−Z is given to an image data front end of a page L, wherein L is 2 to N.

13. The image processing apparatus according to claim 11, wherein
the image expansion is performed upon RIP processing.

14. An image processing apparatus, wherein the image processing apparatus is configured to output a plurality of page images continuously in a conveying direction on a sheet, and the image processing apparatus comprises
a hardware processor that performs data processing on the images on a page basis, wherein
the hardware processor, upon the data processing, obtains a density change of each of the images with reference to a pixel of each of the images within a predetermined width in the conveying direction of the sheet, and, based on the density change, performs density correction of each of the images on a pixel basis within a page, and
in a case where the pixel outside the page is included within the predetermined width in the conveying direction, the hardware processor performs data processing different from the density correction without performing the density correction on the image within the width.

15. The image processing apparatus according to claim 14, wherein
the image has no image pattern change at a boundary portion between pages.

16. The image processing apparatus according to claim 14, wherein
in a case where an area outside the page is within the predetermined width in the conveying direction and the area does not include a pixel of a previous or next page, the hardware processor performs the data processing by regarding the area as a white pixel.

17. The image processing apparatus according to claim 14, wherein in a case where an area outside the page is within the predetermined width in the conveying direction and the area does not include a pixel of a previous or next page, the hardware processor performs the data processing without performing the density correction on the pixel within the width.

18. An image forming apparatus comprising:
the image processing apparatus according to claim 1; and
an image former that forms an image on a sheet, based on image data subjected to density correction by the image processing apparatus.

19. A non-transitory recording medium storing a computer readable program that is executed by a hardware processor outputting a plurality of page images continuously in a conveying direction on a sheet,
the program causing the hardware processor to perform:
obtaining a density change of each of the images with reference to a pixel of each of the images within a predetermined width in the conveying direction of the sheet, and, based on the density change, performing density correction of each of the images on a pixel basis within a page, when performing data processing on the images on a page basis;
wherein in a case where image formation of N pages is performed, wherein N is greater than or equal to 2,
when the density change is obtained for a pixel at a rear end of an image of a page M', a pixel at a front end of an image of a page M'+1 is used, wherein M' is 1 to N+1; and
when the density change is obtained for a pixel at a front end of an image of a page L', a pixel at a rear end of an image of a page L'−1 is used wherein L' is 2 to N.

20. The non-transitory recording medium according to claim 19, wherein
in a case where image formation of N pages is performed, output is performed with an image interval Z between pages.

* * * * *